(12) United States Patent
Allen

(10) Patent No.: US 6,721,061 B1
(45) Date of Patent: Apr. 13, 2004

(54) METHOD AND APPARATUS FOR DISPLAY OF BANDING

(75) Inventor: Roy D. Allen, North Andover, MA (US)

(73) Assignee: Agfa Corporation, Wilmington, MA (US)

( * ) Notice: Subject to any disclaimer, the term of this patent is extended or adjusted under 35 U.S.C. 154(b) by 0 days.

(21) Appl. No.: 09/464,128

(22) Filed: Dec. 16, 1999

Related U.S. Application Data

(63) Continuation-in-part of application No. 09/393,237, filed on Sep. 9, 1999, now Pat. No. 6,164,847, and a continuation-in-part of application No. 09/206,217, filed on Dec. 5, 1998, now Pat. No. 6,535,307, which is a continuation-in-part of application No. 08/800,937, filed on Feb. 13, 1997, now Pat. No. 6,219,154.

(60) Provisional application No. 60/099,881, filed on Sep. 11, 1998.

(51) Int. Cl.$^7$ ................................................ H04N 1/00
(52) U.S. Cl. .................... 358/1.9; 358/406; 358/450
(58) Field of Search ......................... 358/1.9, 406, 450, 358/504, 540; 400/74; 283/72, 85

(56) References Cited

U.S. PATENT DOCUMENTS

| | | |
|---|---|---|
| 4,004,923 A | 1/1977 | Hensel |
| 4,183,990 A | 1/1980 | Uchida et al. |
| 4,273,045 A | 6/1981 | Crowley |
| 4,310,248 A | 1/1982 | Meredith |
| 4,419,426 A | 12/1983 | Kehl |
| 4,504,141 A | 3/1985 | Yamakoshi |
| 4,532,596 A | 7/1985 | Pugsley |
| 4,534,288 A | 8/1985 | Brovman |
| 4,546,700 A | 10/1985 | Kishner et al. |
| 4,588,298 A | 5/1986 | Nakamura |
| 4,679,071 A | 7/1987 | Kitagawa |
| 4,852,485 A | 8/1989 | Brunner |
| 4,913,049 A | 4/1990 | Sainio |
| 5,031,534 A | 7/1991 | Brunner |
| 5,056,430 A | 10/1991 | Bayerlein et al. |
| 5,138,667 A | 8/1992 | Roch et al. |
| 5,160,845 A | 11/1992 | Stumbo et al. |
| 5,227,815 A | 7/1993 | Dastin et al. |
| 5,237,394 A | 8/1993 | Eaton |
| 5,434,604 A | 7/1995 | Cleary et al. |
| 5,493,321 A | 2/1996 | Zwaldo |
| 5,530,460 A | 6/1996 | Wehl |
| 5,636,330 A | 6/1997 | Barak |
| 5,857,784 A | 1/1999 | Allen |
| 6,137,592 A * | 10/2000 | Arquilevich et al. ......... 358/1.8 |
| 6,181,816 B1 * | 1/2001 | Adams, Jr. et al. ......... 382/162 |

FOREIGN PATENT DOCUMENTS

| | | |
|---|---|---|
| CH | 681929 A5 | 6/1993 |
| EP | 0518559 A | 6/1992 |
| EP | 0518525 | 12/1992 |
| FR | 2206868 | 5/1974 |

OTHER PUBLICATIONS

Schmitt, "Fogra Mitt", 43(148);22–24 (Aug. 1994).

Schmitt, "Fogra Mitt", 42(147);19–26 (Dec. 1993).

Munger, K., "The UGRA/FOGRA Digital Control Wedge and Its Application", pp. 48–61.

"GAFT/Systems of Merritt, Digital Plate Control Target".

(List continued on next page.)

*Primary Examiner*—Thomas D. Lee
(74) *Attorney, Agent, or Firm*—Edward L. Kelley; Ira Heffan; Robert A. Sabourin

(57) ABSTRACT

A visual sensor includes a reference portion comprising an image independent of banding and a banding test portion adjacent to the reference portion comprising an image sensitive to banding. In one embodiment, the visual sensor also includes a process check portion adjacent to the banding portion for indicating whether a predetermined imaging parameter is within designated limits.

34 Claims, 20 Drawing Sheets

OTHER PUBLICATIONS

Sabotka et al., "A Special VFG–GLV Test Target for Postscript Output devices", pp. 63–74.

R. Allen, "Registration method for providing high visual magnification of micro–position errors", Color Hard Copy and Graphic Arts II, SPIE Proceedings Series, vol. 3018, pp. 389–397, Feb. 1997.

R. Levien, "Highly sensitive register mark based on moire patterns", Color Hard Copy and Graphic Arts II, SPIE Proceedings Series, vol. 1912, pp. 423–427, Feb. 1993.

R. Allen, "Visual Tools, Image Quality Measurement without Instrumentation", Sep. 7–11, 1998 pp. 168–173 (ICPS 1998) vol. 2 of Proceedings.

* cited by examiner

Banding sensor with integrated visual reference & process check tiles

Max=26, Min=15, P-P=11

METHOD AND APPARATUS FOR DISPLAY OF BANDING

CROSS-REFERENCE TO RELATED APPLICATIONS

This application is a continuation-in-par of U.S. patent application Ser. No. 09/206,217, filed on Dec. 5, 1998, now U.S. Pat. No. 6,535,307 which is a continuation-in-part of U.S. patent application Ser. No. 09/800,937 filed Feb. 13, 1997, now U.S. Pat. No. 6,219,154 and this application is a continuation-in-part of U.S. patent application Ser. No. 09/393,237, filed Sep. 10, 1999, now U.S. Pat. No. 6,164,847 which claims priority to provisional application No. 60/099,881 filed Sep. 11, 1998. These applications are incorporated by reference.

TECHNICAL FIELD

This invention relates to digital imagesetting and, more particularly, to visual sensors for detecting banding.

BACKGROUND INFORMATION

Printing presses use plates to print ink onto paper and other media. One method used for creating plates is to expose photosensitive film with the matter to be printed. When the film is developed, the matter imaged on the film may be imaged onto a photosensitive plate, sometimes referred to as "burning" a plate. After processing, the plate can be used on a press to print the matter onto a medium. Part of the plate, usually the part defining the image to be printed, retains ink, while the other part of the plate does not. When the plate is introduced to ink and then to paper or other medium, the image is printed on the medium.

In a black and white printing job, there is usually one plate that is used to print black ink. In a color printing job, a different plate may be used for each color ink. A color job may use three colors of ink, usually cyan, magenta, and yellow, which in combination can be used to make other colors. A plate is usually produced for each color ink. Often, in addition to cyan, magenta, and yellow, black ink is also used. An additional plate is then required to print the black ink. Occasionally, one or more colors will be printed separately as well, referred to as a "spot color." That color will also have its own plate.

Electronic prepress systems have used an imagesetter to receive raster data associated with a plate and to image the raster data onto photosensitive film. In this context, a raster may specify an image by pixels in columns and rows, at a predefined resolution. The film is then used to create a plate. The imagesetter exposes the photosensitive film pixel by pixel. One way that imagesetters image the raster data is to scan a laser across and down a piece of film. Electronics control the laser to expose, or refrain from exposing, each pixel in the raster data. The imagesetter images the pixels on the film in a manner that is precise and repeatable. Recently, platesetters also have been used to create plates directly from raster data without the use of intermediate film. Imagesetters, platesetters and like print engines, including proofers, are also referred to generally as output devices and writing engines.

Modern output devices may write or record images on various media used in image reproduction, including but not limited to photo or thermal sensitive paper or polymer films, photo or thermal sensitive coatings, erasable imaging materials or ink receptive media mounted onto an image recording surface, polymer film or aluminum based printing plate materials. Such media are mounted onto a recording surface which may be planar or curved.

Conventional digital imagesetters include a raster image processor (RIP) which receives signals representing an image to be recorded on the applicable media and converts the signals into instructions to a scanner which scans the recording media to produce the desired image. It is the function of the RIP to process the received signals representing the image into a corresponding instruction set that can be understood by the scanner.

Noise in various components of a writing engine, such as vibrations or inaccurate laser scan mechanisms for example, can result in imaging artifacts, sometimes referred to as banding.

Generally, a large component of banding artifacts are line spacing errors, meaning errors in the uniformity of line spacing, or, in other words, local variations in the address size compared to mean address over a long length of copy. High end recording systems are extremely sensitive to such noise effects. Uniformity of line spacing is often required to be less than $+/-\frac{1}{3}$ to $+/-\frac{1}{10}$ pixel error at maximum engine addressability. Often a specification for a high end recording system specification requires that imaging artifacts due to banding be essentially invisible for a range of possible output image patterns. This objective is hard to achieve, and it is equally hard to measure since any visible banding exceeds the threshold of failure. It is thus difficult to certify that a writing engine meets its specification, since it is difficult to determine if the writing engine meets the banding criteria.

The traditional method of qualifying a writing engine for banding is to image a full test page with a halftone test pattern that represents the maximum level of difficulty. For an engine with a maximum addressability of 3600 dpi, for example, a page might be imaged at a 96% tint level at 318 lines per inch. To test banding effects resulting from line spacing uniformity errors in the range of $\frac{1}{10}$ pixel requires a very dark tint, typically greater than 80% to 90%. Also, it typically requires some single pixel structures in the tint pattern. For these reasons a 96% tint is often used. Even at this high tint value, the low visibility of residual $\frac{1}{10}$ to $\frac{1}{5}$ pixel line spacing uniformity errors requires a large sample size, often greater than 6×6 inches to reliably detect the level of resulting banding error. For this reason a full page often is imaged for evaluation. The imaged media is compared with a separate master pass/fail reference page. Observation conditions, such as lighting, viewing angle, and condition of the master can influence the comparison. The visual appearance of the test page is also sensitive to setup/process conditions of the engine and the media. For example, the visual level of banding is generally very sensitive to exposure. A test can be made to change from pass to fail simply by increasing the exposure setting slightly. This is a critical problem when attempting to provide a consistent standard for banding pass/fail criteria. Generally, the exposure must be within 0.3D density units of correct setting, and the writing engine must be focused so that it is within 5% of its design value for every test to obtain useful banding detection results.

In addition to being difficult, the banding qualification process is time consuming and uses a large amount of media—often a full page for each test. It would therefore be useful to have a more efficient and accurate mechanism to qualify the banding effects of a writing engine.

SUMMARY OF THE INVENTION

A visual indicator is described that can be used to qualify the banding of an writing engine. The visual sensor can be imaged on a media to magnify the effect of banding to make the measurement of banding more apparent to a user or machine vision system.

In general, in one aspect, the invention relates to a visual indicator including a reference portion including an image independent of banding and a banding test portion adjacent to the reference portion including an image sensitive to banding. In one embodiment, the banding test portion includes two patterns which when superimposed together magnify the visibility of banding errors. In another embodiment, the banding test portion includes two patterns which when superimposed by first imaging a first pattern and second imaging a second image on top of the first image together magnify the visibility of banding errors. In another embodiment, the banding test portion includes two patterns which when superimposed together magnify the visibility of adjacent line spacing errors.

In another embodiment, the banding test portion includes two overlaid images imaged at different addressabilities. In another embodiment, the banding test portion includes a first image imaged at a first addressability n, and a second image superimposed on the first image imaged at a second addressability m, where m≧n. In another embodiment, the banding test portion includes a first image imaged at a first addressability n, and a second image superimposed on the first image imaged at a second addressability m, where m is approximately 2n. In another embodiment, the banding test portion includes a first imaged horizontal one-on/one-off lines imaged at a first addressability n, and horizontal two-on/three-off horizontal lines imaged at a second addressability m, where m is approximately 2n. In another embodiment, the banding test portion includes superimposed horizontal 1-on, 1-off lines imaged at 1800 dpi and horizontal 2-on, 3-off horizontal lines imaged at 3600 dpi.

In one embodiment, the reference portion includes a coarse pattern. In another embodiment, the reference portion includes a coarse pattern modulated in the vertical axis to simulate banding.

In another embodiment, indicator also includes at least one process check portion adjacent to one of the banding test portion and the reference portion. In another embodiment, the process check portion includes a first process check portion having a first imaging characteristic and a second process check portion proximate to the first process check portion having a second imaging characteristic, wherein the imaging characteristic of one of the first and second process check portions is less sensitive to an imaging parameter than the imaging characteristic of the other of the first and second process check portions, and wherein the imaging characteristic of the first process check portion and the second process check portion appear substantially similar for at least one imaging parameter setting range and appear different otherwise. In another embodiment, one of the first and second process check portions includes a coarse tint and the other of the first and second process check portions includes a fine tint. In another embodiment, the coarse tint is a (n×n) periodic pattern and the fine tint is a (m×m) periodic pattern such that (n>m). In another embodiment, the imaging parameter is at least one parameter chosen from the set of exposure setting, pulse width modulation, focus, balance, spot size, spot shape, spot ellipticity, sidelobes size, sidelobes shape, sidelobes intensity, modulation ON/OFF beam intensity ratio, media gamma, edge sharpness, dot gain, uniformity, ink receptivity of plate material, physical media changes, pattern dependent effects, sensitivity to position errors, and sensitivity to exposure errors.

In general, in another aspect, the invention relates to a method for generating a visual indicator. The method includes forming a reference portion comprising an image independent of banding and forming a banding test portion adjacent to the reference portion comprising an image sensitive to banding. In one embodiment, the banding portion includes two patterns which when superimposed magnify the visibility of banding errors. In another embodiment, the banding portion includes two patterns which when superimposed magnify the visibility of adjacent line spacing errors. In another embodiment, the step of forming the banding test portion includes imaging a first pattern and imaging a second pattern overlaid on the first pattern. In another embodiment, the step of forming the banding test portion includes imaging a first pattern at a first imaging parameter setting and imaging a second pattern overlaid on the first pattern at a second imaging parameter setting.

In one embodiment, the step of forming the banding test portion includes imaging a first pattern at a first addressability and imaging a second pattern overlaid on the first pattern at a second addressability. In another embodiment, the step of forming the banding test portion includes imaging a first pattern at a first addressability n and imaging a second pattern overlaid on the first pattern at a second addressability m, where m≧n. In another embodiment, the step of forming the banding test portion includes imaging a first pattern at a first addressability n and imaging a second pattern overlaid on the first pattern at a second addressability m, where m is approximately 2n. In another embodiment, the step of forming the banding test portion includes imaging a first pattern of one-on/one-off horizontal lines at a first addressability n and imaging a second pattern of two-on/three-off horizontal lines overlaid on the first pattern at a second addressability m, where m is approximately 2n. In another embodiment, the step of forming the banding test portion includes superimposing horizontal 1-on, 1-off lines imaged at 1800 dpi and horizontal 2-on, 3-off horizontal lines imaged at 3600 dpi. In another embodiment, the step of forming the reference portion includes forming a reference portion comprising a coarse pattern. In another embodiment, the step of forming the reference portion includes forming a reference portion comprising a coarse pattern modulated in the vertical (cross scan) axis to simulate banding.

In one embodiment, the method also includes the step of forming a process check portion adjacent to the banding test portion or the reference portion. In one embodiment, the step of forming the process check portion includes forming a first process check portion having a first imaging characteristic and forming a second process check portion proximate to the first process check portion having a second imaging characteristic wherein the imaging characteristic of one of the first and second process check portions is less sensitive to an imaging parameter than the imaging characteristic of the other of the first and second process check portions, such that the imaging characteristic of the first process check portion and the second process check portion appear substantially similar for at least one imaging parameter setting range and appear different otherwise.

In one embodiment, one of the first and second process check portions includes a coarse tint and the other of the first and second process check portions includes a fine tint. In another embodiment, the coarse tint is a (n×n) periodic pattern and the fine tint is a (m×m) periodic pattern such that (n>m). In another embodiment, the imaging parameter is at least one parameter chosen from the set of exposure setting, pulse width modulation, focus, balance, spot size, spot shape, spot ellipticity, sidelobes size, sidelobes shape, sidelobes intensity, modulation ON/OFF beam intensity ratio, media gamma, edge sharpness, dot gain, uniformity, ink receptivity of plate material, physical media changes, pattern dependent effects, sensitivity to position errors, and sensitivity to exposure errors.

In general, in another aspect, the invention relates to a banding indicator including a first pattern imaged at a first imaging parameter configuration value and a second pattern overlaid on the first pattern, the second pattern imaged at a second imaging parameter configuration value. The first and second pattern are configured so that the image resulting from the overlay of the first pattern and the second pattern is sensitive to banding. In one embodiment, the imaging parameter is addressability. In another embodiment, the imaging parameter is at least one parameter chosen from the set of exposure setting, pulse width modulation, focus, balance, spot size, spot shape, spot ellipticity, sidelobes size, sidelobes shape, sidelobes intensity, modulation ON/OFF beam intensity ratio.

In general, in another aspect, the invention relates to a method for generating a banding indicator. The method includes imaging a first pattern at a first imaging parameter configuration value, and imaging a second pattern overlaid on the first pattern, the second pattern imaged at a second imaging parameter configuration value. The first and second pattern are configured so that the image resulting from the overlay of the first pattern and the second pattern is sensitive to banding. In one embodiment, the step of imaging the first pattern includes imaging the first pattern at a first addressability and the step of imaging the second pattern includes imaging the second pattern at a second addressability. In another embodiment, the step of imaging the first pattern includes imaging a first pattern at a first addressability n and the step of imaging the second pattern includes imaging the second pattern at a second addressability m, where $m \geq n$. In another embodiment, the step of imaging the first pattern includes imaging a first pattern at a first addressability n and the step of imaging the second pattern includes imaging the second pattern at a second addressability m, where m is approximately 2n.

In general, in another aspect, the invention relates to a visual reference for characterizing banding indicated by a banding indicator. The indicated banding is referred to as the banding signature of the imaging device. The visual reference includes an image coarse enough to produce a tint signature that is relatively independent of banding, exposure setting, and focus setting. The image has the same mean tint level as the banding indicator, and the signature has approximately the same visual characteristics as a predetermined banding signature.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

Figure 1:
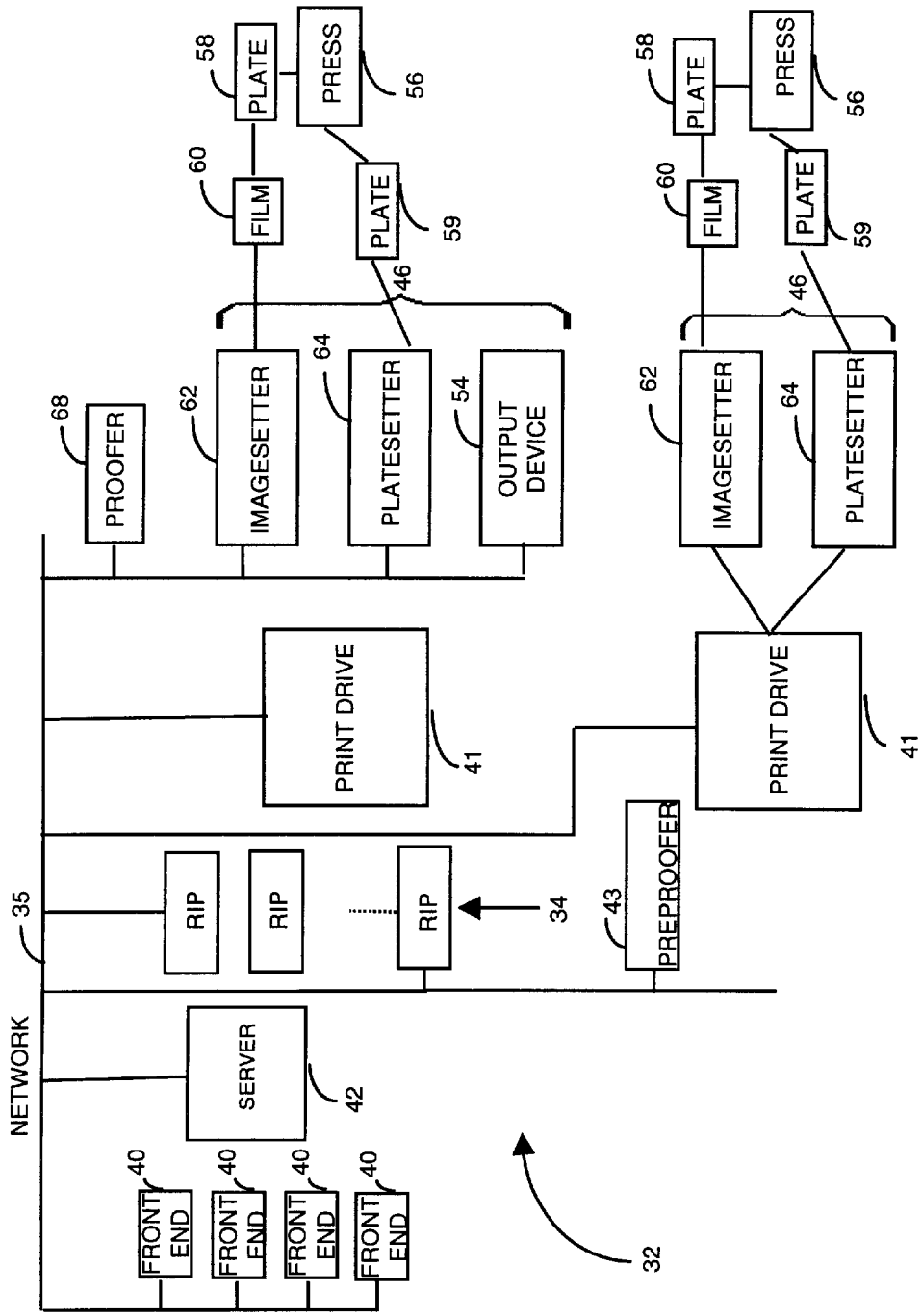
FIG. 1 is a block diagram of an embodiment of a prepress imaging system according to the present invention.

Referring to FIG. 1, a digital prepress system, generally referred to by reference numeral 32, includes one or more computers that are referred to as front ends 40. The front ends 40 are connected to computer network 35. The front ends 40 are used for creating, editing, or otherwise preparing image data for printing. Both color and black and white images are prepared on the front ends 40 for processing by the prepress system and eventual image reproduction by a printing press 56 using a printing plate 58. The front ends 40 can be commercially available computers, for example including, but not limited to computers having operating systems such as Windows NT™, Mac OS™, or a version of UNIX™. The front ends 40 have imaging application software such as that commercially available as Quark Express™ and Adobe Pagemaker™. The front ends 40 may also have imposition software used to lay out pages within an image, such as Impostrip™. Impositioning software positions one or more pages within an image, so that multiple pages are presented in a single image. Having multiple pages imaged on a single plate increases productivity, because multiple pages are printed at the same time. The imaging application software and the imposition software both produce images coded in a page description language. The front ends 40 can output images coded in a page description language directly to raster image processors ("RIPs") 34 via the network 35. The front ends 40 can also output images to an image server 42 via the network 35.

The network 35 can be any of the various types of commercially available computer networks, but must be of sufficient capacity to handle the traffic generated by the prepress system. In one embodiment, the network is a Fast Ethernet network, including a 100 baseT Hub and appropriate connections between the networked components and the hub.

In one embodiment, image server 42 receives images output from front ends 40 and stores them on the system. Image server 42 can queue jobs for immediate transmission to one of the RIPs 34 when a RIP 34 becomes available. Image server 42 can also store images from the front ends 40 for later processing by RIPs 34. Image server 42 helps improve workflow efficiency by allowing front end users to output their jobs even if the RIPs 34 are busy. By queuing a job for the RIP 34 on the server 42, the RIP 34 can be kept continuously busy.

The RIPs 34 may be software RIPs operating on a computer system, which may be one of the front ends 40, or on a server class computer system. Such software RIPs include the Agfa Viper™ software RIP and the Agfa Taipan™ software RIP available from Agfa Division of Bayer Corporation in Wilmington, Mass. The RIPs 34 may also be dedicated hardware RIPs, such as the AgfaStar™ hardware REP, also available from Agfa. Each RIP 34 has a software and/or hardware RIP module for RIP functions such as screening, trapping, imposition, page or image combination, color separating, and/or color management of image data.

The RIPs 34 each include an input network interface module over which text page description language or other types of input image files are received from front ends 40 or the image server 42. Each RIP 34 thus appears on the network and can be accessed by any front end 40 or the image server 42 or other computer system on the network 35. The input network interface module may also serve as an output network interface module so that a single network interface connection connects each RIP 34 to the network 35. In another embodiment, a separate network connection connects each RIP 34 to a print drive 41 to maximize system performance.

Figure 2:
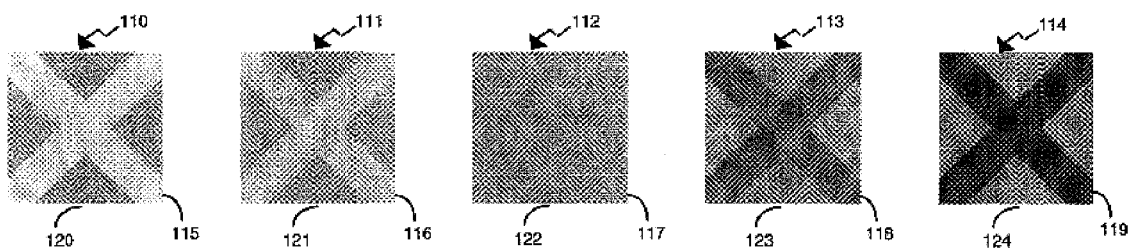
FIG. 2 is an example of an embodiment of a visual sensor according to the present invention showing symbol contrast change with incremental steps of a test parameter.

A print drive 41 includes a plurality of software modules operating on a standard computer platform configured for efficient print drive functions. The print drive hardware may also include a number of interface boards or modules including a fast network interface and hardware connection to an output device 46 such as an imagesetter 62 or platesetter 64. Print drive 41 receives raster data that is output from RIPs 34, and stores the images for output by output devices 46. Print drive 41 may be connected to the RIPs 34 via the network 35, or may have individual connections to the RIPs. The print drive 41 may be directly connected to the output devices 46, as shown in the embodiment of FIG. 2, or it may connect with the output devices via network 35, or via other connections. The final output devices 46 include imagesetters 62 and platesetters 64. Output devices can also include proofer 68, and printers and plotters 54, and such other output devices used in the industry.

Imagesetter 62 images on photosensitive film or paper. The photosensitive film 60 is used to make at least one plate 58. A plate 58 is used on press 56 to print one color of an image. On a black and white image, only one color, black, is usually necessary. For a color image, generally at least the three "process" colors, cyan, magenta, and yellow, and often a fourth color, black, are used. These colors are sometimes referred to as "CMYK." One or more "spot colors," which refers to an additional color, may be used as well. The imagesetter 62 images the raster data for each color onto film, and the film is used to make a plate 58. The plates are then used on the press to print high quality printed material, often in large quantities. This result of the electronic prepress printing process may be referred to as the final image. Examples of imagesetters are the Selectset Avantra™, the SelectSet 7000™, and the AccuSet Plus™ imagesetters, all available from Agfa Division, Bayer Corporation of Wilmington, Mass.

Platesetter 64 images directly onto a plate 59, without the use of film 60. By use of a platesetter 64, the step of creating a plate 58 by using film 60 is eliminated. This can improve the workflow, because it eliminates a step, and also eliminates the material cost of film 60. Examples of platesetters are the Agfa Galileo™ platesetter and the Agfa Polaris 100™ digital platesetting system, available from Agfa Division, Bayer Corporation of Wilmington, Mass.

Proofer 68 is an output device that outputs images. An example of a proofer is the Agfa DuoProof Ultra™ available from Agfa Division, Bayer Corporation of Wilmington, Mass. Another example of a proofer is the POLAPROOF, also available from Poloroid Corporation, Cambridge, Mass. A proofer can image onto plain paper or other media, and may use techniques including, but not limited to, toner dispersion, thermal wax transfer, and dye sublimation. The proofer may output monochrome images and/or color images. Color images may be imaged using process colors, which are three or four colors that are combined to produce a color image. A proofer may have any line ruling and resolution, although generally the resolution is less than the resolution of the final image. For example, a final image may be imaged by a final output device at 3600 dpi, while the maximum resolution of a proofer may be 600 dpi.

Preproofer 43 converts RIP processed raster data into data that can be displayed by proofer 68. In one embodiment, preproofer 43 is software that runs on a general purpose computer, such as a server class computer running such operating systems as Windows NT™, MacOS™, or a version of UNIX. In another embodiment, preproofer software is included on the same system as a front end 40, a RIP 34, or a print drive 41. If the preproofer is software residing on a front end 40, a RIP 34, or a print drive 41, the system must be of sufficient capacity to handle the added functionality. In another embodiment, preproofer 43 is a dedicated hardware platform.

For the digital prepress system of FIG. 1, it is useful to calibrate the output devices 46. It is also useful to qualify the output device 46 to determine that it meets specification. Calibration includes adjustment or image quality check of various imaging parameters. Imaging parameters are variable that affect the image, and include, but not limited to such variables as exposure setting, pulse width modulation, focus, balance, sidelobe size, sidelobe shape, sidelobe intensity, spot ellipticity, media transfer function and gamma, edge sharpness, dot gain, uniformity, ink receptivity to media, physical media changes, pattern dependent effects, sensitivity to position errors, and sensitivity to exposure errors. To calibrate a writing engine or to verify imaging quality, it is often necessary to measure the output at various imaging parameter settings. This can be a time consuming process. It is useful to have a visual sensor that can indicate to a user or technician an appropriate imaging parameter setting. Such a sensor can be imaged on a media to detect imaging parameters. Such a sensor can also be detected by a machine vision system.

It was described in U.S. patent application Ser. No. 09/206,217, that a visual sensor having two or more portions, including a first image portion and a second image portion, can be imaged to provide information about, one or more imaging parameters. The sensor is able to detect the state of one or more imaging parameters. The first image portion has a first imaging characteristic, and the second image portion has a second imaging characteristic. Imaging characteristics are characteristics of an image that can include such features as apparent density level, tint, color, reflectivity, absorption, granularity or microstructure, size, shape, distribution, degree of randomness, structure, edge sharpness, and depth or dimension. One of the portions is less sensitive to one or more imaging parameters than another portion, so that at least two image portions appear substantially similar at a desired range of imaging parameters, and appear different otherwise. The imaging characteristic of the a portion is distinguishable from the imaging characteristic of another portion for one or more ranges of one or more imaging parameters, and is not distinguishable for the alternate range(s) of the one or more imaging parameters. A range can be a particular imaging parameter value, or a range that excludes one or more imaging parameter values.

In one embodiment, at least one of the image portions has a shape, and another image portions forms a background surrounding some or all of the shape. One or more shapes can form separate but adjacent regions, or image portions, within a sensor. The shapes can be designed to produce a visually detectable contrast when subjected to certain imaging conditions. Symbol shapes provide additional information in graphic form. For example, an arrow can indicate direction of best focus, a plus sign can indicate that an image is overexposed, and one or more alphanumeric characters can indicate which parameter is being measured.

Referring to FIG. 2, a visual sensor 110–114 is shown as an imaging parameter is decremented from right to left through five imaging parameter settings. The visual sensors 110–114 each include a first portion, the tinted background 120–124, and a second portion, the tinted symbol 115–119. In these sensors, the symbol 115–119 is the letter "X". An imaging characteristic of the symbol 115–119 and the background 120–124 is tint density. The density contrast between the symbol and background tints are manipulated by the imaging parameter. In this example, the symbols 115-199 and the background 120–124 are imaged with different fill patterns. The tint fill patterns are the patterns of dots that compose a tint. Tint fill patterns can be periodic, such as 1×2 vertical lines, or 2×2 checkerboard patterns, or more complex patterns, or alternatively, tint fill patterns can be aperiodic and/or random. The symbols 115–119 fill pattern and the background 120–124 fill patterns have a different imaging characteristic, meaning that they react differently to an imaging parameter. In this example, the background 120–124 consists of a coarse tint which has low sensitivity to the imaging parameter while the symbol 115–119 consists of a fine tint having high sensitivity to the imaging parameter. The high visual contrast of the symbol results from a difference in the imaging characteristic of the two image portions, that is in this example the sensitivities of the two fill patterns to the imaging parameter. The fill patterns are chosen to produce equal density to the eye when the desired parameter condition is met and to produce unequal densities otherwise. As a result, in the example of FIG. 3, the symbol 'X' is visible 115,116,118,119 as the imaging parameter is varied (for a particular range of imaging parameters) and is substantially not visible 117 when the imaging parameter is another range of imaging parameter values. A fine tint background and a coarse tint symbol could also work, but using the coarse tint in the background provides that the background tint will be consistent with the changes to the imaging parameter for each of the sensors.

The symbol is not readily distinguishable from the background when the apparent density of the symbol and the background are substantially similar, and this is what is meant by substantially not visible. Sensors can be designed having other imaging characteristics that are sensitive to other imaging parameters (i.e. other than apparent density), and that will render a shape or symbol substantially invisible at some imaging parameters values and visible at others.

In the example of FIG. 2, the five instances 110–114 of the visual sensor are imaged, each with a different imaging parameter setting. In this example, the imaging parameter that is manipulated is pulse width modulation. When the imaging parameter pulse width modulation is set to its lowest value 110, the fine tint of the symbol X 115 appears much lighter than the background 120. When the pulse width modulation is set to it's next lowest value 111, the fine tint of the symbol X 116 appears darker, but still lighter than the background 121. At the median pulse width modulation setting 112, the fine tint of the symbol X 117 is indistinguishable from the background 122. At a higher imaging parameter setting 1 13, the symbol X 1 18 appears darker than background 123. At the highest imaging parameter setting 114 shown in the example of FIG. 3, the symbol X 119 appears much darker than the background 124. In all instances of the sensor 110–114, the background 120–124 is a coarse tint that is substantially insensitive to the imaging parameter, and so the background appears to be substantially the same tint at all imaging parameter levels. The example shows that the sensor reaches a null at middle parameter value. The null is the imaging parameter value at which the symbol is substantially similar to the background. In this example, the symbol has tint that is substantially similar to the background at the middle parameter setting. A sensor might be designed so that the symbol and background are substantially similar for one value, as in this example, or for more than one value, or for a range of values. A sensor can also be designed to operate in the opposite manner, so that the contrast is high at a desired parameter setting at the contrast is low otherwise.

Configuration of a writing engine may require multiple imaging parameters, and an imaging parameter may have multiple competing criteria for its proper set-up. One or more of these criteria may not be directly measurable on the media with traditional tools. Calibration by some subsequent process step may be required. To accomplish set-up or image quality qualification by direct observation of the media itself, an group of visual sensors can be used, one for each variable and possibly several for comparative visual reference. Each visual sensor can be designed to isolate an imaging parameter from the interactive performance of the imaging system. For example, a sensor may be calibrated to visually display performance of a subsequent process step by incorporating the appropriate transfer function as structural change in a fill pattern. Since the transfer function is incorporated into the fill pattern, there is no error due to a unit-to-unit engine variations and therefore no need for custom calibration of each engine.

Figure 3:
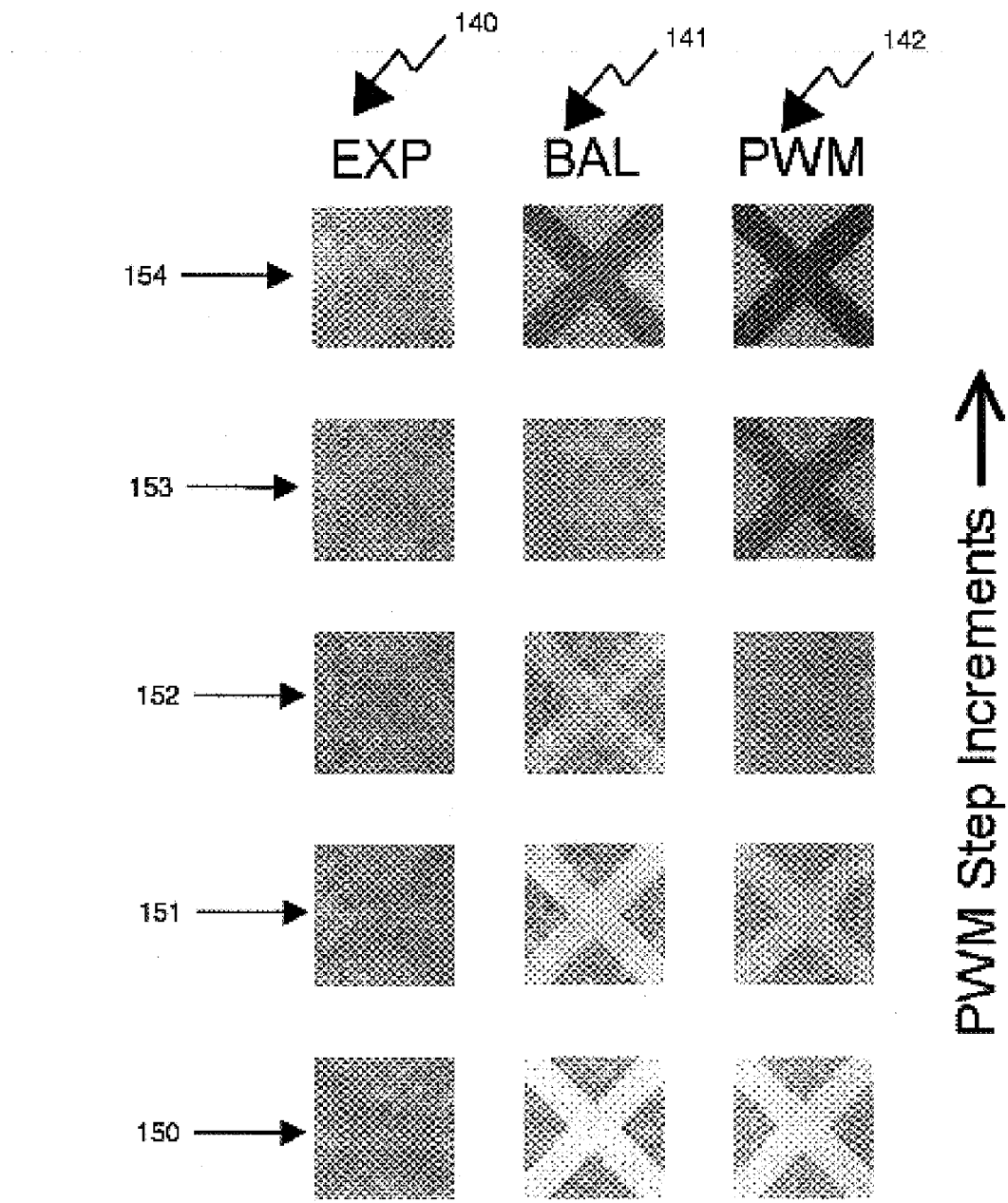
FIG. 3 is an embodiment of a sensor array for monitoring three imaging parameters.

Referring to FIG. 3, a series of sensors is used to calibrate the video modulation duty cycle imaging parameter. The video modulation duty cycle is calibrated by adjusting the pulse width of the beam "on" state in a laser recording system, referred to as pulse width modulation ("PWM").

Pulse width modulation varies the weight of vertical lines by a fraction of a pixel but has no effect on horizontal lines since they are not modulated. The effect on the vertical axis of PWM is often limited to patterns with modulation components of less than 10 to 20 pixels.

One common set-up criteria for a writing engine is to adjust PWM until the dot error for a given reference halftone tint is zero. Dot error is the deviation for the correct geometric weight of a pattern. For example, a pattern that has a 10% dot error appears 10% darker than its geometric weight. A 1-on 1-off fill pattern has a 50% geometry. A 1-on 1-off fill pattern with a 10% dot error will appear to be a 60% tint.

PWM adjustment can be a form of dot gain compensation. A possible complication of adjusting PWM for dot error without also considering other variables is that other significant image quality issues may be masked, for example a defocused spot, low modulation contrast or poor response time. In the calibration and qualification processes, it can be useful to qualify focus, modulation contrast, and/or response time as well as set up PWM.

Figure 4:
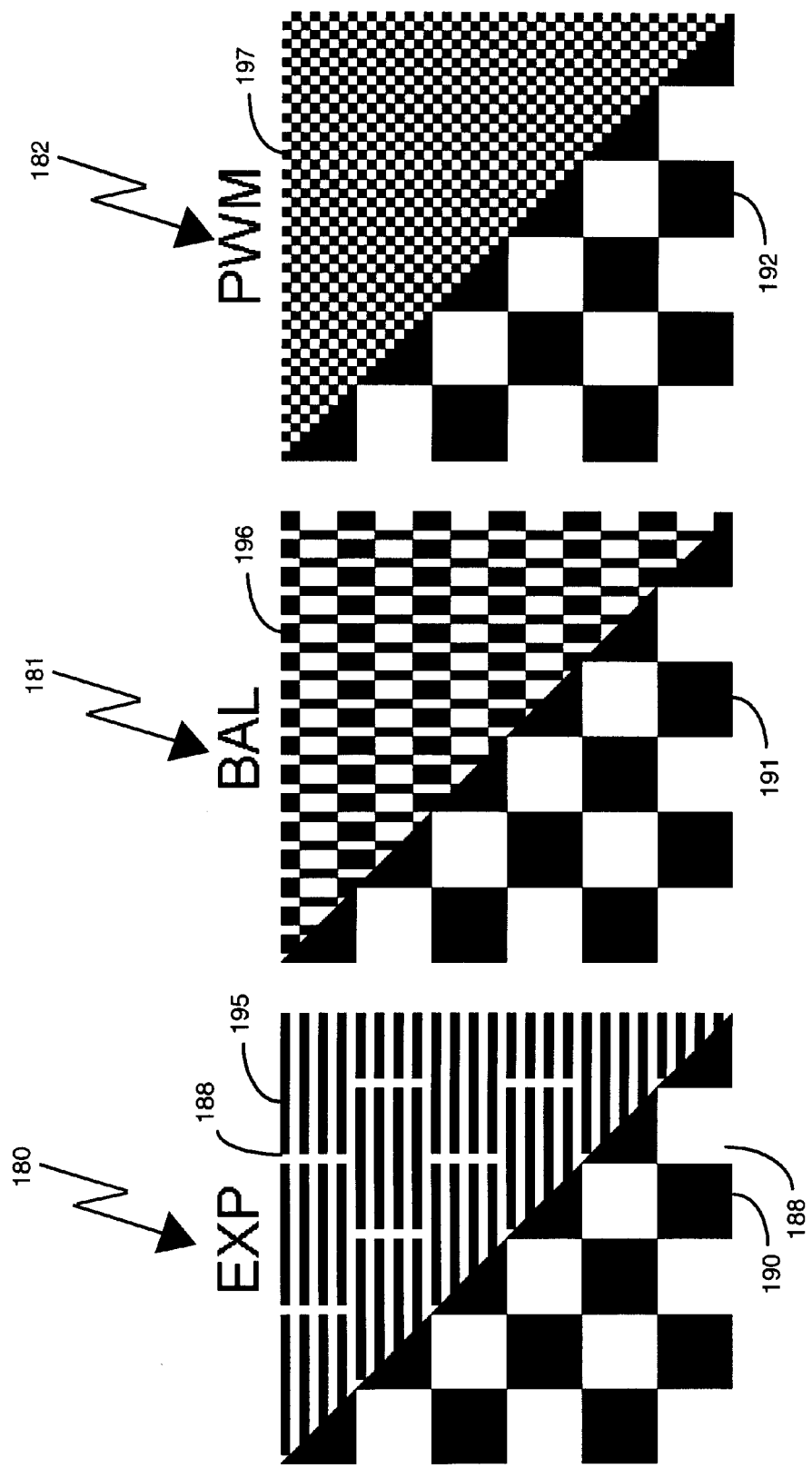
FIG. 4 is a magnified view of the fill patterns used for the sensor array of FIG. 4.

Still referring to FIG. 3, a visual sensor array 140–142 is imaged at five imaging parameter values 150–154. In this example, the array is stepped at five values for PWM, meaning that for each instance of the sensors the array is imaged at a different imaging parameter (PWM) value. In the first column 140 is the exposure level sensor ("EXP") for determining a correct exposure level visually. The sensor in the second column 141 is a balance sensor that indicates a geometric balance ("BAL") condition. In this example, balance is defined as the point where the dot error magnitude for a 1×2 pixel vertical line pattern is equal but opposite in sense to that for a 2×1 vertical pattern. The sensor in the third column 142 determines the zero dot error point. Each row 150–154 shows the sensor array imaged at a different PWM setting. In the example of FIG. 4, the imaging parameter PWM is incremented in the direction from row 150 to row 154 so row 150 has the lowest PWM setting of the set and row 154 has the highest setting.

In this example, exposure, balance, and zero dot error point are imaging parameters. The imaging characteristic is apparent tint (density). One portion, the symbol, of each sensor has one imaging characteristic, and the other portion, the background, has another imaging characteristic. The different imaging characteristics of the sensor image portions result in observable differences in the portions for various imaging parameters.

Figure 5:
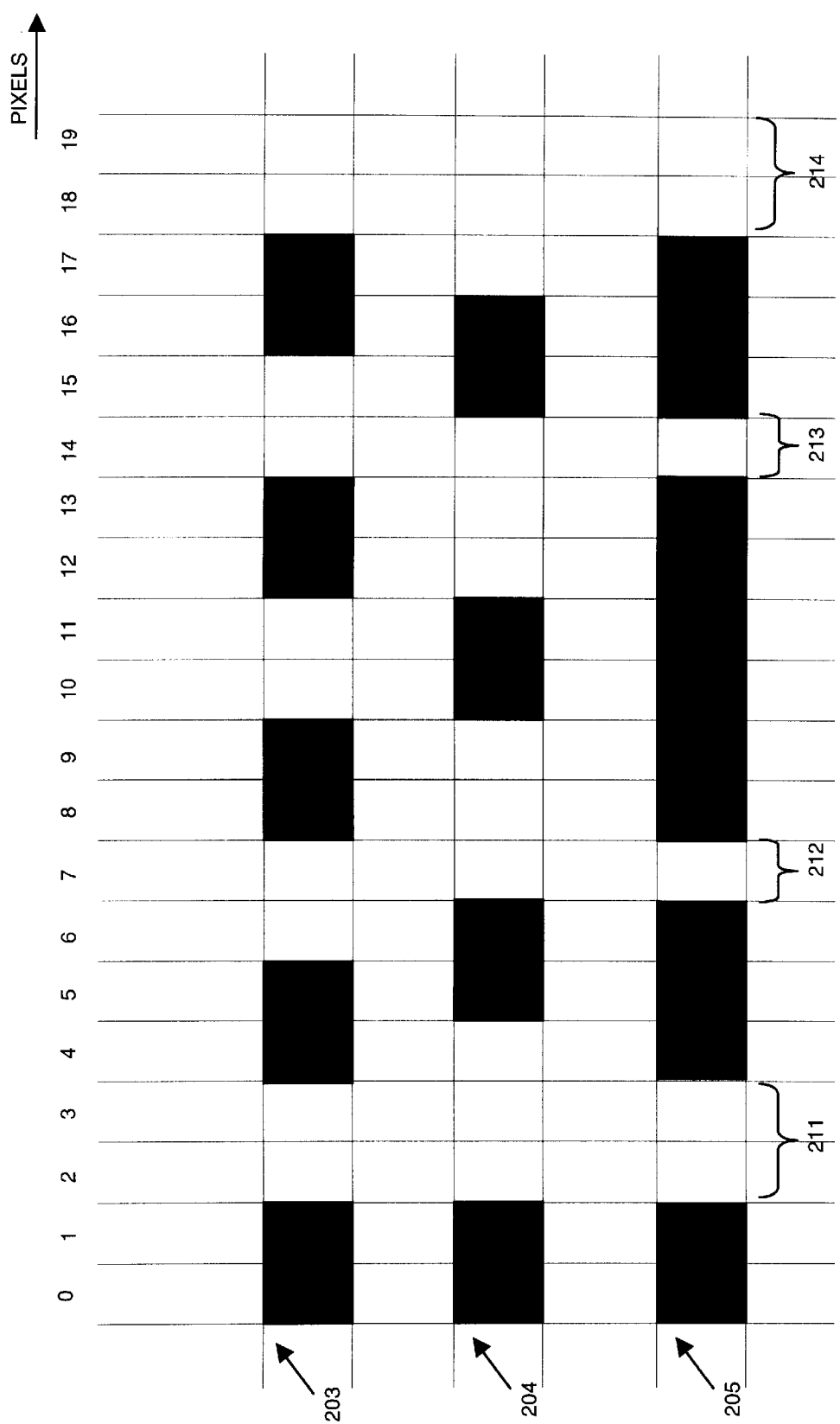
FIG. 5 depicts two patterns that are overlaid according to the invention.

The exposure sensor 140 is used to determine a reference exposure setting. The exposure sensor 140 compares the tint levels produced by two different fill patterns: 1×1 horizontal lines and 8×8 pixel horizontal lines. Referring to FIG. 5, in the enlargement of the exposure sensor 180, both the 1×1 and the 8×8 line patterns contain a gap 188 in the vertical axis repeating at a sixteen pixel pitch. In the coarse background tint 190, the gap is eight pixels which results in a checkerboard pattern. In the fine tint of the symbol 195, the gap is smaller and is only one or two pixels. This gap 188 can be adjusted to tune the density intercept point, which is the imaging parameter value at which the symbol 195 and background 190 appear similar. By properly selecting gap size, the sensor can be set to a desired exposure criteria. Non-integer gap size is achieved by alternating between several integer pixel gap sizes in a repeating pattern. For this exposure sensor, the sensitivity is about 1% contrast change for 2% exposure change. The sensor is independent of PWM changes since that PWM affects the fine and coarse patterns equally. FIG. 4 shows the exposure sensor is at its density intercept point or null since the symbol is not visible. This indicates to the operator that the array has been imaged at the correct exposure setting.

Referring again to FIG. 3, the balance sensors in the second column 141 can be used to detect a geometric balance condition, meaning that the highlights and shadows of a halftone tint have approximately the same absolute value of dot error. For the purposes of the sensor, geometric balance is an imaging parameter defined as the point where the dot error magnitude for a 1×2 pixel vertical line pattern is equal but opposite in sense to that for a 2×1 vertical pattern. Referring to FIG. 4, the fill pattern for the balance symbol 196 therefore contains an equal mixture of 1×2 and 2×1 pixel vertical line patterns. The background 191 is an 8×8 pixel checkerboard pattern. The equal mixture of 1×2 and 2×1 pixel vertical line patterns produces a sensitivity response equal to the midpoint between the sensitivities of the two line tints. The two tint patterns are in balance when the tint of the combined line patterns equals the tint of the low resolution 8×8 checkerboard pattern.

Referring again to FIG. 3, the PWM sensors in the third column 142 determine the zero dot error point. In general, calibration (set-up) of PWM is dependent on exposure. The PWM sensor 142 detects dot error at the exposure and PWM settings. Referring to FIG. 4, the PWM sensor 182 compares 1×1 and 8×8 pixel checkerboard patterns. These two tints will appear to be identical and approximately equal to 50% when the image quality is in tolerance range. Sensitivity of this PWM sensor is about 1% contrast change for 0.2% change of dot error of 8×8 checkerboard.

A sensor array can be imaged at calibrated increments of PWM value. In a properly functioning writing engine, the null points for a PWM sensor array 142 and a BAL sensor array 141 will occur at the same PWM value. If the image quality is compromised by other factors, for example if there are errors present that are masked by PWM compensation, the null points for the two sensor arrays 141, 142 will differ. The direction and magnitude of this difference is a measure of quality. So also is the magnitude of PWM compensation required for zero dot error. In practice, to qualify or calibrate a system, tolerances are placed on the amount of PWM compensation allowed, the deviation between the null points of tiles, and the exposure setting. As shown in FIG. 4, the PWM sensor array is null in the middle row 152, but the BAL sensor array is null in the second sensor from the top 153. This might imply that the image quality is in fact compromised by other factors, depending on the acceptable tolerances and the relevant imaging parameter settings and step increment.

For example, an imaging system can be calibrated or qualified using the sensor array of FIG. 3. If exposure is acceptable, the sensor indicates whether the amount of PWM adjustment required to produce zero dot error is within a tolerance range. In addition, the sensor can indicate whether the balance condition, as a function of PWM, occurs at a PWM setting close to that for the zero dot error point. The exposure sensor 140 of FIG. 4 indicates that the exposure is within range since the symbol is barely visible. The PWM sensor 142 is null at the median value 152. The BAL sensor 141 is null 153 at a PWM value that is close to the value in which PWM is null. For a small PWM step between sensors, the proximity of the PWM null and the BAL null would probably be acceptable.

If there is a significant tolerance zone that is acceptable for an imaging parameter that may result in some ambiguity in the visual interpretation of a sensor, it is possible to image a reference next to the sensor to demonstrate pass/fail limits. The reference is designed with an imaging characteristic of insensitivity to the imaging parameter, for example a coarse tint in the previous example. The reference thus provides a stable fixed visual effect as the imaging parameter is varied. A tolerance can also be built into the sensor by adding a calibrated bias in the design of the fill patterns.

Varying a imaging parameter while imaging an array of sensors, such as the array of FIG. 3 in which PWM is incremented for each row 150–154, aids the visual decision by providing a range of sensor response from which to make a visual comparison. However, many applications do not allow parameter stepping, such as an isolated sensor that monitors a fixed engine state.

Two repetitive images can be combined (or overlaid) to detect registration errors. A first repetitive pattern is formed, and a second repetitive pattern is formed such that when the first pattern is superimposed on the second pattern, there is a visual symbol or effect if there is alignment or misalignment between the first pattern and the second pattern. The overlay of these images serves to magnify the registration error. In the case of the visual symbol type, the sensor functions because the contrast of the symbol tint with respect the background tint changes dramatically with registration error. However registration sensors are designed so that the eye perceives the contrast between the average tint levels of a symbol and background. Random fine structures (such as banding) in either tint do not affect the user's perception as to whether the symbol is lighter, darker, or about equal to the background tint. This is because the geometry of the banding signature over the length of the symbol is much smaller than the symbol, allowing the eye to perceive an average tint. Because local line spacing uniformity error is random and typically less than +/−⅓ pixel, the average addressability over the tile is the same for both the first and second images of the registration error sensor.

To be sensitive only to banding, a pair of overlaid images generally would be insensitive to registration error, that is, the images would produce the same visual effect regardless of registration error. The visual effect would be highly sensitive to local changes of addressability even if occurring over only a few pixels. The objective here is not to create a uniform tint to the eye but rather to create a highly visible (high contrast) enhanced banding signature that is proportionate to the actual more subtle banding error in the engine. In addition, it is desirable that the enhanced banding be composed of spatial frequencies that are more visible to the eye than those of the actual engine banding error under the same viewing conditions. In this way, a banding indicator shows a visible banding signature even for engine with near perfect spacing uniformity.

For the purpose of sensing banding, it would be ideal to write just a single pattern at maximum engine addressability that contains periodic horizontal (fast scan axis) gaps of a half pixel or less spaced to produce a tint of approximately 90% to 95%. However, this is generally not practical for several reasons. First, writing engines cannot write a line less than 1 pixel wide without tuning exposure to underexpose just that line and without affecting the many horizontal lines that make up the rest of an image. Second, the visual appearance of such a repetitive fractional pixel line would be critically dependant on other engine parameters such as exposure, focus, etc. Such a pattern would be just as sensitive to dynamic variation of spot size, for example, as it is to line spacing uniformity, and therefore would not be insensitive to other engine parameters. Simply put, the ideal single exposed pattern generally is beyond the resolution limit of a writing engine.

To overcome this limitation, in one embodiment, two patterns are written that are more coarse, and that are not beyond the resolution limits of the writing engine. These patterns can be output normally without any exposure tuning. A key feature is that when the two patterns are exposed at the same location on the media, they produce a Moire interference pattern that has fine line structures with gaps of one pixel or less. A gap of less than one pixel is achieved by using a defocused spot on one of the overlaid patterns. This, in turn, is achieved by writing that pattern at a lower engine addressability setting, which eliminates any need for separate control of spot size to achieve a defocused spot. The edge-sharpness of the pattern with the large spot is less than that of the small spot, resulting in exposure overlap into adjacent pixel areas when the two are superimposed. This maximizes pattern sensitivity to local line spacing uniformity errors.

Referring to FIG. 5, a banding indicator including two or more superimposed images or patterns that are imaged using different imaging parameter settings or configurations magnify the visibility of banding errors. Such a banding indicator has a high contrast dark tint that is relatively insensitive to other engine parameters, such as exposure and modulation response time. The banding indicator is repeatable, meaning that it will consistently show the same state of machine banding errors each time it is imaged, and it is compact, meaning that it does not require a large image area. The banding indicator is generally insensitive to imaging parameters other than banding, for example it is relatively insensitive to exposure, meaning that it produces the same visual effect even if it is somewhat under-exposed or somewhat over-exposed. In one embodiment, the banding indicator and a banding visual reference, described further below, both change proportionately with imaging parameter variations so that the effect of the imaging parameter is tracked out and removed from the sensor judgment process.

In the embodiment of FIG. 5, the banding indicator is composed of two overlaid patterns. Portions of the bitmaps of each of the two patterns 203, 204 are shown in the figure. The first pattern 203 is imaged onto a media, and the second image 204 is imaged onto the same media. In one embodiment, two patterns are imaged in sequence, one superimposed on top of the other. In another embodiment, for example with a writing engine that produces multiple writing beams, the two patterns are exposed at the same time by writing a first pattern with one beam and a second pattern with another beam. It is also within the scope of the invention to overlay or superimpose the images in other ways.

In another embodiment, the indicator includes more than two overlaid images. When the indicator includes more than two images, some of the images can be imaged with different imaging parameter settings and some of the images can be imaged with the same imaging parameter settings.

In the embodiment shown in FIG. 5, each of two overlaid images 203, 204 is a horizontal line pattern that is imaged at a different imaging parameter setting or configuration. In the embodiment of FIG. 5, the imaging parameter is addressability (also referred to as resolution), so the first pattern is imaged at a first addressability and the second pattern is imaged at a second addressability. Other imaging parameters, instead of or in addition to addressability, such as at least one parameter chosen from the set of addressability, exposure setting, pulse width modulation, focus, spot shape, modulation ON/OFF beam intensity ratio, and scan velocity, are intended to be within the scope of the invention. For example, a first pattern imaged at a first focus setting, and a second pattern imaged at a second focus setting could generate a banding indicator that is within the scope of the invention.

In the embodiment of FIG. 5, there are no single pixel features in either pattern and there is no modulation in the fast scan axis. These are two reasons why the composite image overlay is relatively insensitive to other engine parameters. When the two images are overlaid 205, the result of two images has a characteristic that could not be achieved by imaging a single image onto the media, specifically, the characteristics of a banding indicator described above.

As shown in FIG. 5, the pixel rulings numbered at the top of the figure are 3600 dpi pixels. The first image 203 is a one-on/one-off horizontal line pattern that is imaged at an addressability of 1800 dpi. Because the figure is ruled with 3600 dpi pixels, each "on" 1800 dpi pixel is shown as being two 3600 dpi pixels wide. This is shown in the figure as dark pixels 0–1, 4–5, 8–9, 12–13, and 16–17 in the first image 203.

The second image 204 is a horizontal line pattern that is imaged at an addressability of 3600 dpi. The image is a two-on/three-off line pattern. This is shown in the figure as blackened pixels 0–1, 5–6, 10–11, 15–16 in the second image 204. Because the figure is ruled with 3600 dpi pixels, each on pixel of the second image 204 is one pixel wide.

In one embodiment, the images are overlaid by being imaged on the same media. In general, writing engines can be configured, in either a normal mode or a test mode, to image two images on the same media. Generally, the writing engine can be configured not to move the media after the first image and before the second image. This configuration is particularly suitable for overlaying two images at different addressabilities. First, the first image is imaged onto the media. Then, without moving the media, the second image is imaged onto the media in the same location on the media as the first image. This allows the two images to be precisely overlaid. In other embodiments, for example in systems that automatically move the media in order to image on the media, the media can be re-inserted, or retracted into the writing engine for after imaging the first image so that the second image can be imaged on the media.

In another embodiment, the two patterns are imaged on separate media, and overlaid on a light table, or other location where the two images on separate media can be viewed. In another embodiment, one image, a first image, is stored in a computer memory, and the other image, a second image, is imaged on the media. Then, the second image is scanned from the media into a computer memory, for example by a machine vision system, and overlaid electronically in the computer memory, for example by an OR operation. Overlay in the memory of a computer-based machine vision system is intended to be within the scope of the invention.

Still referring to FIG. 5, the third image 205 is a portion of the image that results from the overlay of the first image 203 and the second image 204. The overlay of the two images is a repeating pattern in which dark pixels are pixels 0–1, 4–6, 8–13, and 15–17. Note that there are gaps at pixels 2–3 (211) and pixels 18–19 (214) that are two 3600 dpi pixels wide, and there are gaps at pixel 7 (212) and pixel 14 (213) that are one 3600 dpi pixel wide.

Figure 6:
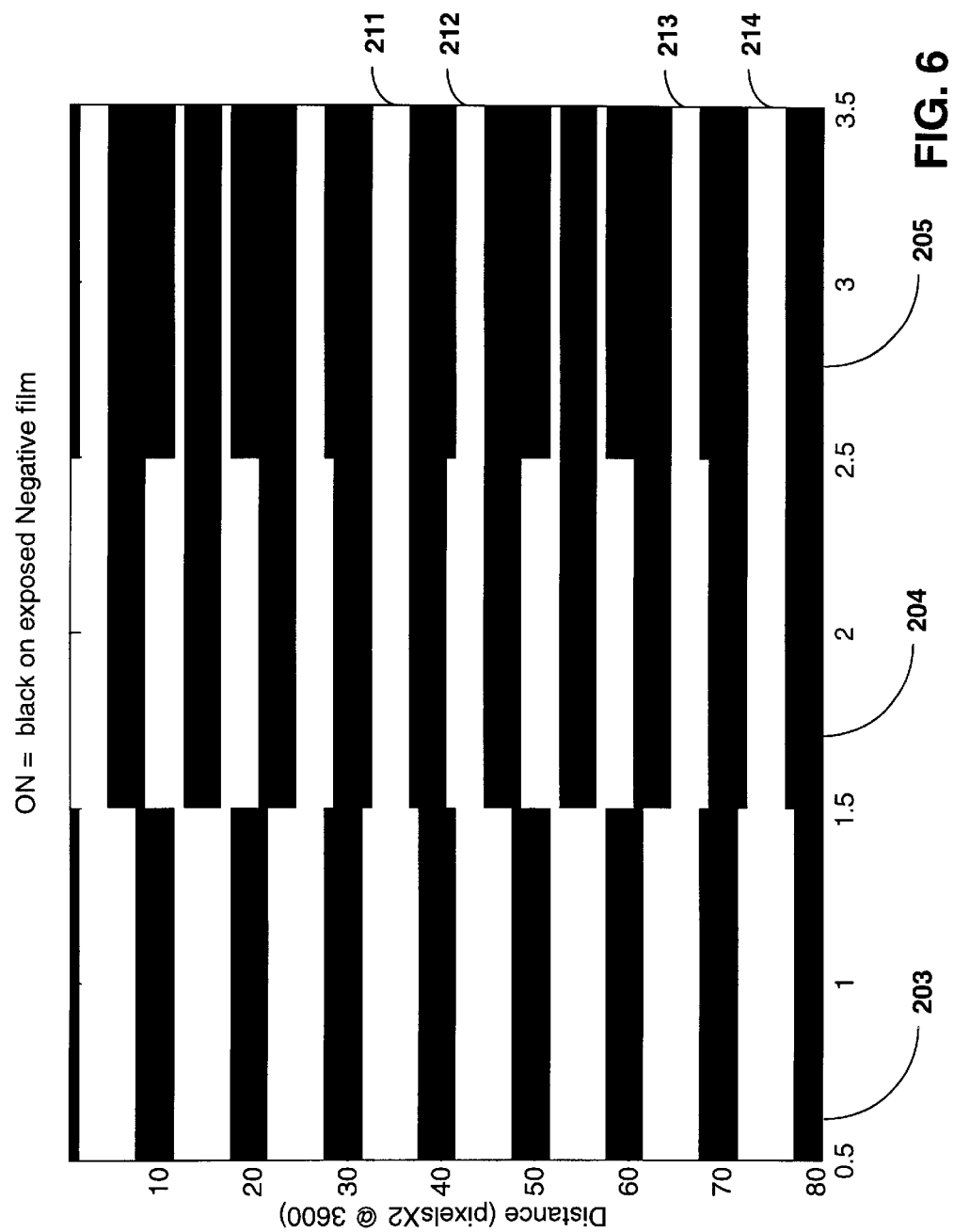
FIG. 6 the bitmaps of the two patterns of FIG. 5.

Referring to FIG. 6, approximately forty pixels length of the horizontal line patterns of FIG. 5 are shown. The first pattern 203 is the two-on/three-off lines imaged at 3600 dpi. The second pattern 204 is the one-on/one-off lines imaged at 1800 dpi. The sum of the two images 205 is shown as the third pattern 210. Again, the sum, or overlay, of the two images is a repeating line pattern that includes two wider gaps 211, 214, that are approximately two 3600 dpi pixels wide, and two thinner gaps 212, 213 that are one 3600 dpi pixel wide.

The waveforms in FIG. 5 show perfect registration. This is useful for demonstrative purposes, but generally not practically achievable. Even a mean registration error between the two patterns of ¼ pixel changes the interference pattern. High end recorders can have registration repeatability errors of up to 3 pixels or more. If there are registration repeatability errors, the interference pattern is simply phase shifted for any integer pixel amount of registration error. There is no change in the structure of the interference pattern. This is a useful feature of the selected patterns. Any non integer portion of registration error (between 0 and 1 pixel) does create some changes in the interference structure. These changes do not adversely effect the overall performance of the banding indicator. The performance of the banding indicator is independent of registration error. To demonstrate this, FIG. 6 shows the interference pattern resulting from a mean registration error of ½ pixel. Other figures may include this or another (arbitrary) pattern alignment.

The bitmaps of FIG. 5 and 6 are representations of the digital commands to the writing engine. In a laser-based writing engine, the data shown in FIG. 5 and FIG. 6 is used to modulate an energy source such as a laser beam to produce an intensity distribution pattern on the media. The intensity distribution associated with a pixel is generally not a perfect circle or square, and generally does not have perfectly defined edges. Also, the final image on the media is the result of the response of the media to the intensity distribution, where the response of the media is determined by a transfer function that varies for different media types. While FIG. 5 and FIG. 6 are useful for describing the images that will be placed on the media, subsequent figures show the intensity profile of the light placed on the media, and the response of the media to that intensity profile. In other words, the subsequent figures show the result of imaging these bitmaps on media.

Thus, while in FIG. 5 and FIG. 6, each of the marked pixels are shown as squares, this is only an approximation of how the actual imaged pixel will appear on the media. In general, the shape of an imaged pixel is generally more round, or "dot" shaped. In general, the size and the shape of the imaged pixel varies based on the addressability at which the imagesetter is configured. For example, the spot size of an image imaged at 1800 dpi is typically two times larger than the spot size of an image imaged at 3600 dpi. One-on/one-off horizontal lines imaged at 1800 therefore typically appears to be different than two-on/two-off horizontal lines imaged at 3600 dpi, at least in part because the imaging spot size is larger for the pattern imaged at 1800 dpi. This variation has implications for banding display image generation.

An image that has very narrow lines magnifies banding by making small registration errors more apparent to the eye. Such lines have the effect of magnifying banding errors. It generally is not possible by conventional means to image lines that are more narrow than the highest addressability of the writing engine. It is possible, however, to make such a narrow line pattern by overwriting two images that have coarse periodic structures of different spatial frequencies which are selected to generate a Moire interference pattern which produces very narrow lines.

The two overlaid patterns shown in FIG. 5 and FIG. 6, the 1800 dpi one-on/one-off horizontal line pattern and the 3600 dpi two-on/three-off horizontal line pattern are used as an example of this type of structure, but other patterns can also be used. Just as one example, depending on the media type and gamma, a three-on/two-off horizontal line pattern instead of the two-on/three-off horizontal line pattern can work equally well, and in some cases may have superior performance.

Generally, in determining patterns that will work well for detecting banding, it is desirable that the pitch of the combined pattern (referred to as the interference pattern) resulting from overlay of two patterns be small enough to be invisible to the eye under the designated viewing conditions. If the shorter pitch divided by the longer pitch is less than 0.9, the combined patterns should not be unduly sensitive to registration error. If the resulting pattern has single pixel (or less) features they should be sensitive to banding. If the patterns are coarse enough in the fast scan axis, (such as horizontal lines) the patterns should be sufficiently insensitive to modulation errors.

The combined pattern 205 in FIG. 5 has a pitch of 20 pixels at 3600 dpi. At a viewing distance of 20 inches this results in an angular pitch of 62.8 cycles/degree, which is below the limit visible to the eye. The high sensitivity to banding derives from variations in the writing engine's ability to reproduce the interference pattern structure due to local banding error. This technique is unlike using a Moire interference pattern to detect registration error by observing variations in the size and shape of the interference pattern with misregistration. The sensitivity of the combined patterns does not come from changes of the interference pattern structure itself. Rather, the sensitivity is due to variations in the printablity of an interference pattern that has a structure that is beyond the resolution of the eye.

Figure 7:
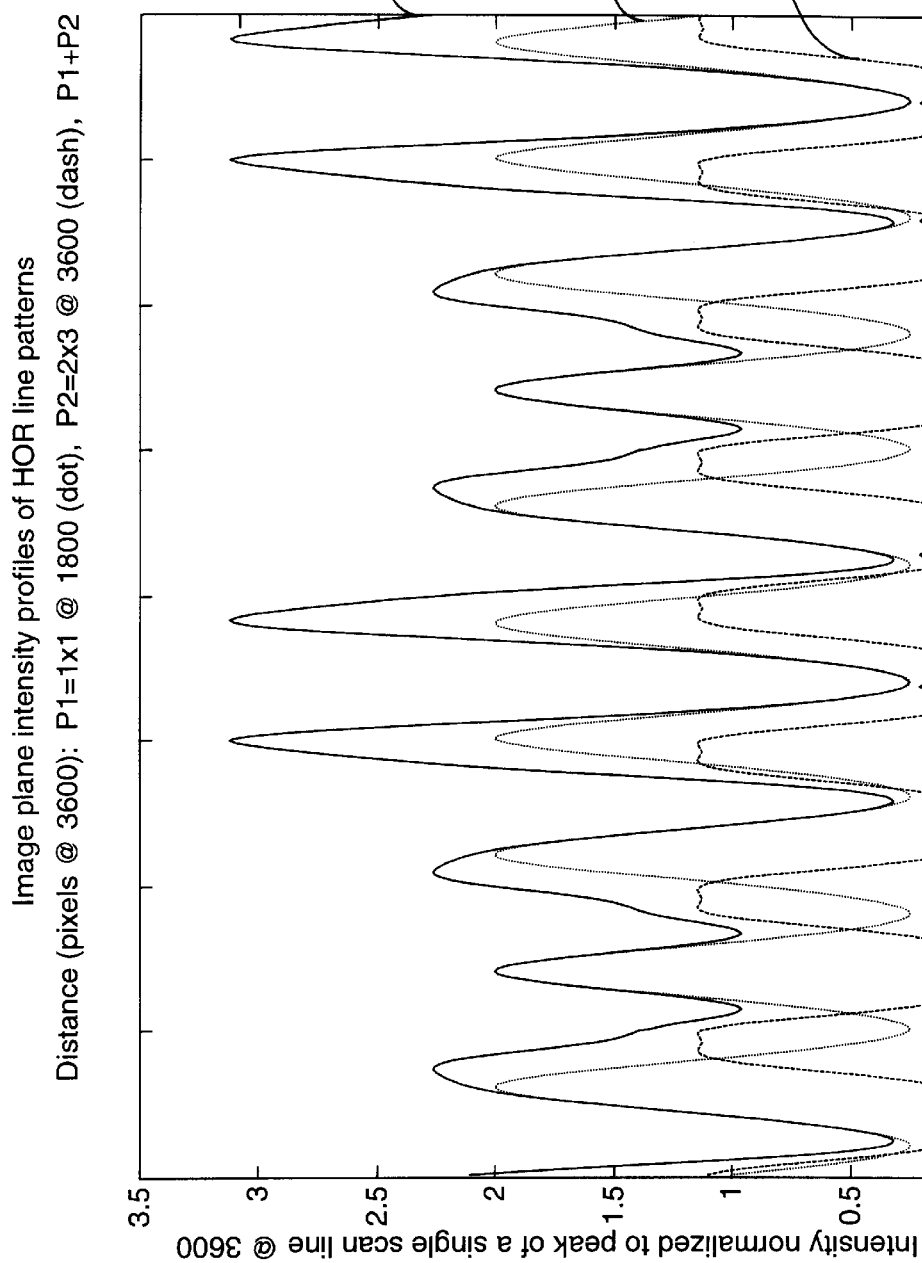
FIG. 7 depicts the image plane intensity profiles of the patterns of FIG. 5 in a graph format.

Referring to FIG. 7, the normalized intensity profile of the three patterns of FIG. 5 and FIG. 6 are shown for a cross-section of forty scanlines. The intensity profile shows the amount of energy that is directed onto the media by the imaging laser when the patterns are imaged. The intensity profile is normalized to the peak of an isolated single scanline at 3600 dpi, which media and produce a black image, and intensities significantly below the threshold will not expose the media (e.g. film will remain clear). Since the media is not binary (it has finite gamma of approximately 12), exposure levels in the vicinity of the threshold will produce shades of gray proportionate to exposure level.

The dashed line 220 of FIG. 7 represents the intensity of the two-on/three-off pattern imaged at 3600 dpi. The normalized intensity of the two-on/three-off pattern varies between approximately 0 and 1.2, meaning that there is sometimes no intensity imaged (shown as normalized intensity of zero) and sometimes there is more than enough intensity to image black. The dotted line 221 represents the intensity of the one-on/one-off pattern imaged at 1800 dpi. The normalized intensity of the one-on/one-off pattern varies between approximately 0.3 and 2.0. As the normalized intensity does not reach zero, the one-on/one-off pattern always puts some amount of energy onto the media, even in the off cycle. This is a result of the size of the 1800 dpi spot in proportion to the address size (i.e. pattern pitch) which causes exposure overlap into the "off" regions of the pattern.

The solid line 222 represents the intensity of the combined patterns, and is the sum of the other two lines. The gaps 211, 212, 213, 214 shown in FIG. 5 are still present at approximate pixel locations of 17, 21, 33, and 37 pixels respectively in FIG. 7. But the gaps are not uniform in intensity and, because the intensity of the one-on/one-off pattern is never zero, the intensity of the sum, even in the gaps 211, 212, 213, 214 is never zero.

Figure 8:
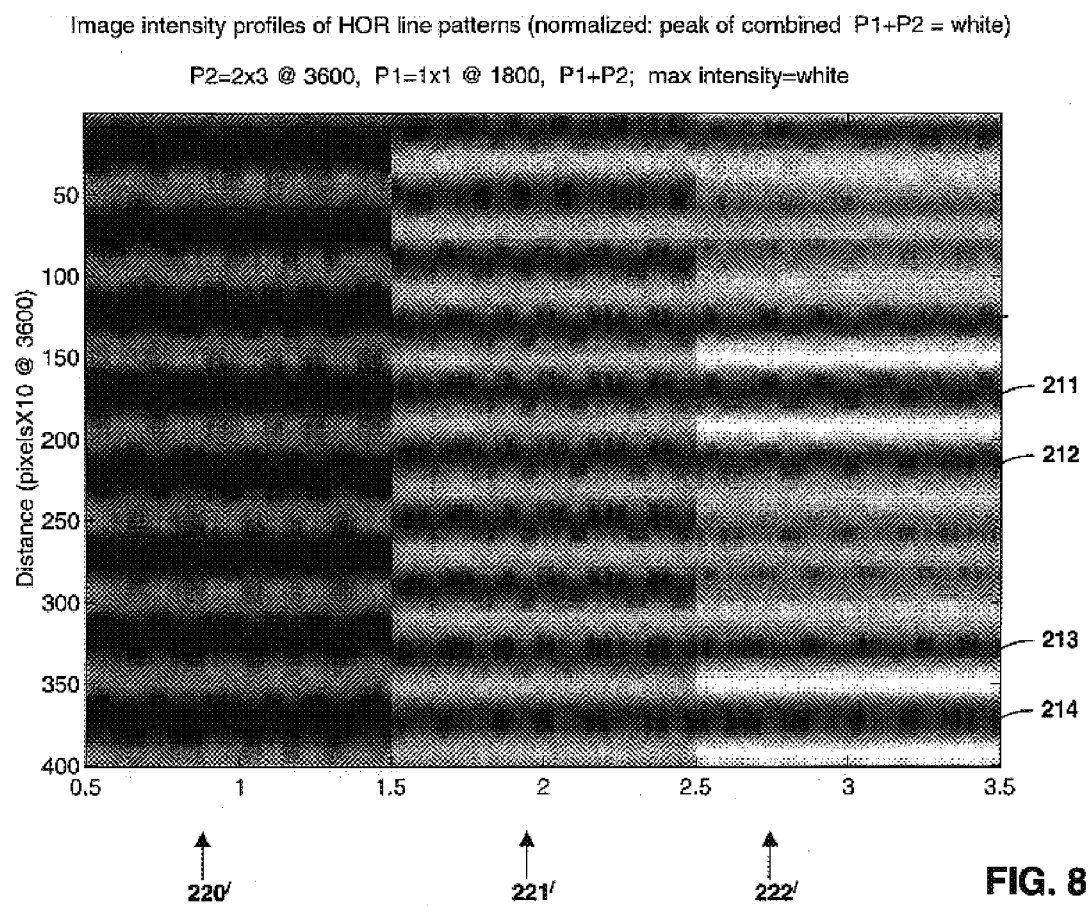
FIG. 8 depicts the image plane intensity profiles of the patterns of FIG. 5 in an image format.

Referring to FIG. 8, the image intensity profiles of FIG. 7 are shown as displayed intensity values, for a range of forty pixels (scale is pixels×10). In other words, zero intensity is shown as black and high intensity is shown as tending toward white. The levels are normalized as before so that maximum white is the peak intensity of the third image 222' and maximum black is the zero intensity value in the first image 220'. While the levels are approximate, due to limitations in plain-paper reproduction, nevertheless, the first image 220' shows the intensity of the two-on/three-off pattern imaged at 3600 dpi. The second image 221' shows the intensity of the two-on/two-off pattern imaged at 1800 dpi. The third image 222' shows the intensity of the sum of the two patterns 220', 221'. This figure is intended to provide a visualization of the relative intensities and contrast of the three patterns in FIG. 7. The soft edge effects in the combined image are apparent as subtle variations of gray compared to the more sharp high contrast edges of the 3600 pattern. The figure shows that the "off" portions of the 3600 dpi image are much darker than the "off" portions of the 1800 dpi image. Note that this shows the intensity profile, not the response of the media.

Figure 9:
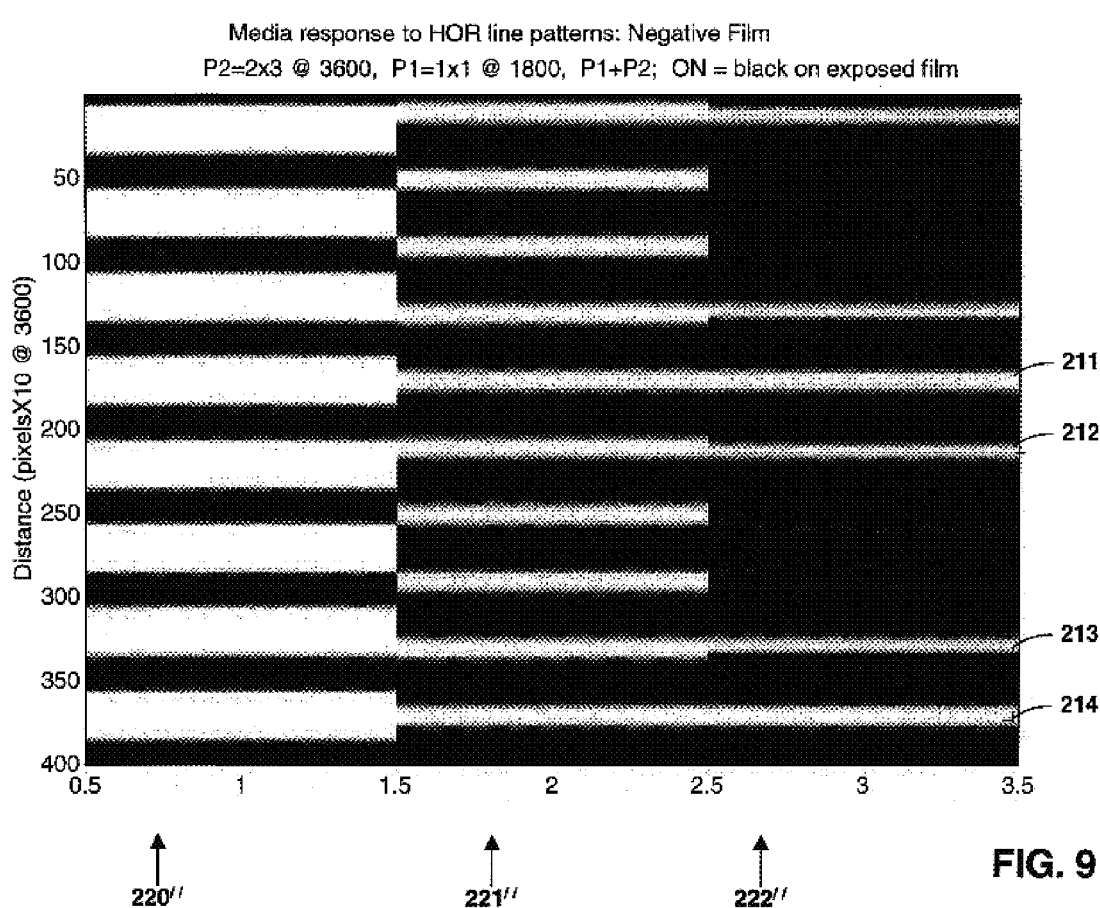
FIG. 9 depicts the media response to the intensity profiles of FIG. 7 and FIG. 8.

Referring to FIG. 9, the media response of negative film (AGFA Alliance HN imagesetter film) to the intensity patterns of FIG. 8 is shown. Again, the tone levels are approximate for demonstrative purposes. Because the media is negative media, the higher exposure intensities result in a black image, and the lower exposure intensities tend toward white. The amount of intensity required to cause a color change in the media depends on the properties of the media. In this case, the media has a relatively high gamma (slope of media density versus exposure response curve), so the image includes small gray slits that are sensitive to banding. As shown in the figure, the two-on/three-off 3600 dpi pattern 220" is black and white. The one-on/one-off 1800 dpi pattern 221" is also black and white, but has more of a gray aspect to it. The sum 222" of the two patterns 220", 221" is somewhat gray at the smaller gaps 212", 213".

Figure 10:
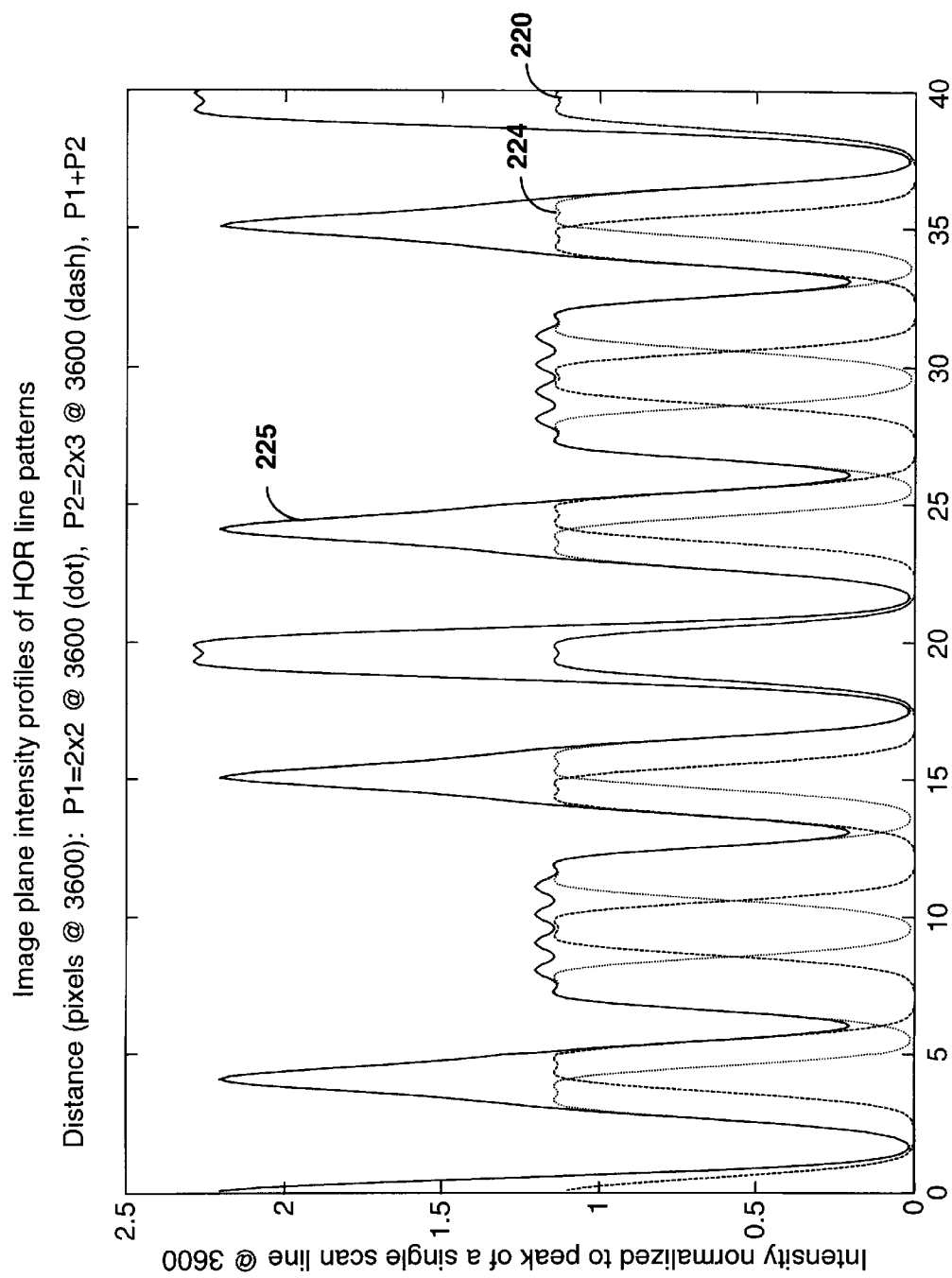
FIG. 10 depicts the image plane intensity profiles of one two patterns imaged at the same addressability, for comparison to FIG. 7.

Referring to FIG. 10, for comparison to FIG. 7, normalized intensities are shown for two patterns that are both imaged at 3600 dpi. The first pattern 220, is the two-on/three-off pattern described in the earlier figures. The second pattern 224 is a two-on/two-off pattern imaged at 3600 dpi. While theoretically a two-on/two-off pattern imaged at 3600 dpi is identical to a one-on/one-off pattern imaged at 1800 dpi, it is apparent from FIG. 10 that the intensity profile of the two-on/two-off 3600 dpi pattern 224 is quite different from the intensity profile of the one-on/one-off pattern imaged at 1800 dpi 221 (FIG. 7). While the intensity of the one-on/one-off 1800 dpi pattern 221 (FIG. 7) was never zero, the intensity of the two-on/two-off 3600 dpi pattern 224 is zero at low intensity points. Also, the gaps in the sum 225 of the two-on/three-off 3600 dpi image 220 and the two-on/two-off 3600 dpi image 224 are wider in FIG. 10 than the sum 223 in FIG. 7, at least in part because of the smaller spot used to image the two-on/two-off 3600 dpi pattern.

Figure 11:
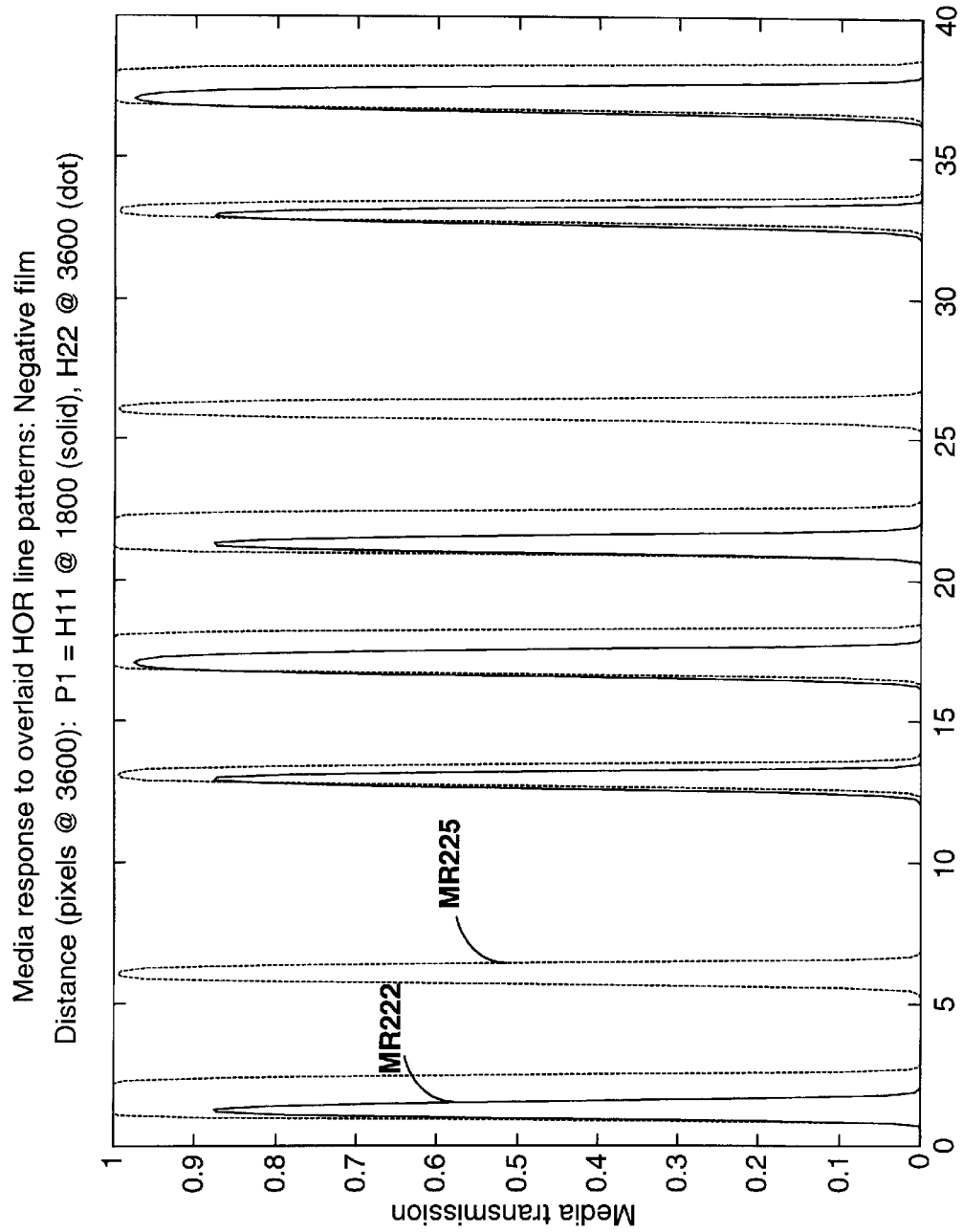
FIG. 11 depicts media response to the overlaid patterns of FIG. 7 and the overlaid patterns of FIG. 10.

Referring to FIG. 11, the media response MR225 of the sum 225 of the FIG. 10 patterns is compared to the media response MR222 of the sum 222 of the FIG. 7 patterns. The media response is the response of the media to the sums of the intensity profiles shown in FIG. 7 (222) and FIG. 10 (225). The comparison of the media response MR222, MR225 shows that the mean transmission value using the one-on/one-off 1800 dpi pattern MR222 is 0.1, which is a 90% tint. The mean transmission value, which is the average value for many repetitions of the pattern, using the two-on/two-off 3600 dpi pattern MR225 is 0.25, which is a 75% tint value. Thus, the media response of the combined 1800 dpi and 3600 dpi patterns has a much higher tint value (90% tint) than the two combined 3600 dpi patterns and the open slits in the combined 1800 dpi and 3600 dpi pattern are thinner, and so reach only a gray level (transmission less than 1) against a black background. This offers improved sensitivity to banding compared to the larger slits with the clear openings of the two combined 3600 dpi patterns. This is because the gray level of the thin slits is approximately in the linear response range of the media, closer to the media exposure threshold.

Figure 12:
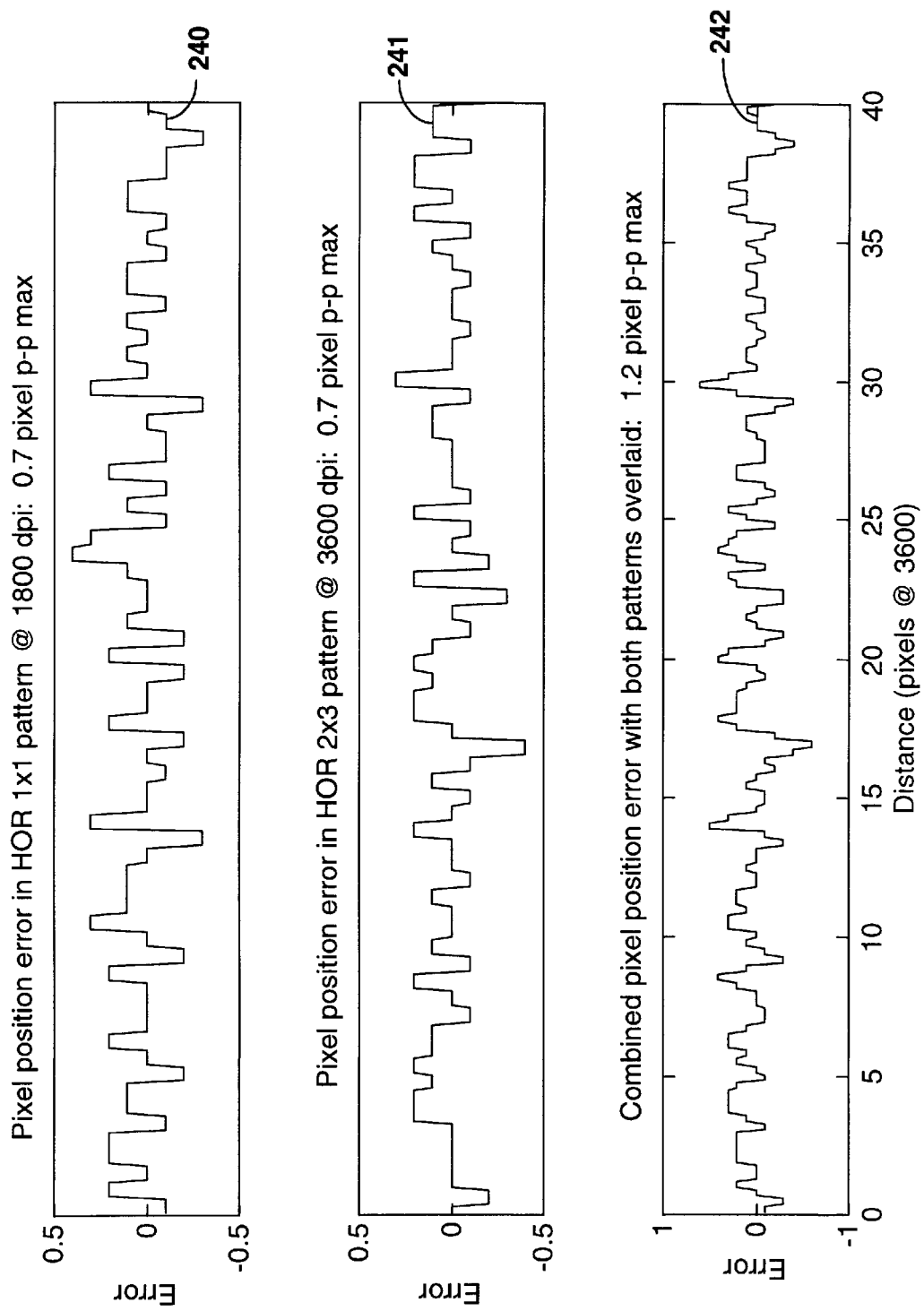
FIG. 12 depicts a simulated banding error.

Referring to FIG. 12, the model or example jitter banding effect shown in the figure is introduced into the overlaid images of FIG. 5 to simulate a pixel position banding error. The model banding effect was created by introducing random noise with a maximum peak-to-peak value of 0.7 pixels at 3600 dpi, having a standard deviation of 0.15 pixels into each of the two images. The random noise is different for each of the images, as would typically be the case for an actual banding error in a writing engine. The random noise introduced into the one-on/one-off 1800 dpi pattern is shown in the first graph 240, the random noise introduced into the two-on/three-off 3600 dpi pattern is shown in the second graph 241. The total error introduced into the combined images is shown in the third graph 242. The total peak-to-peak noise amplitude of the combined pattern is approximately double that of either of the individual patterns because the two patterns are superimposed. This feature provides a further increase in banding sensitivity for a given amount of noise.

Figure 13:
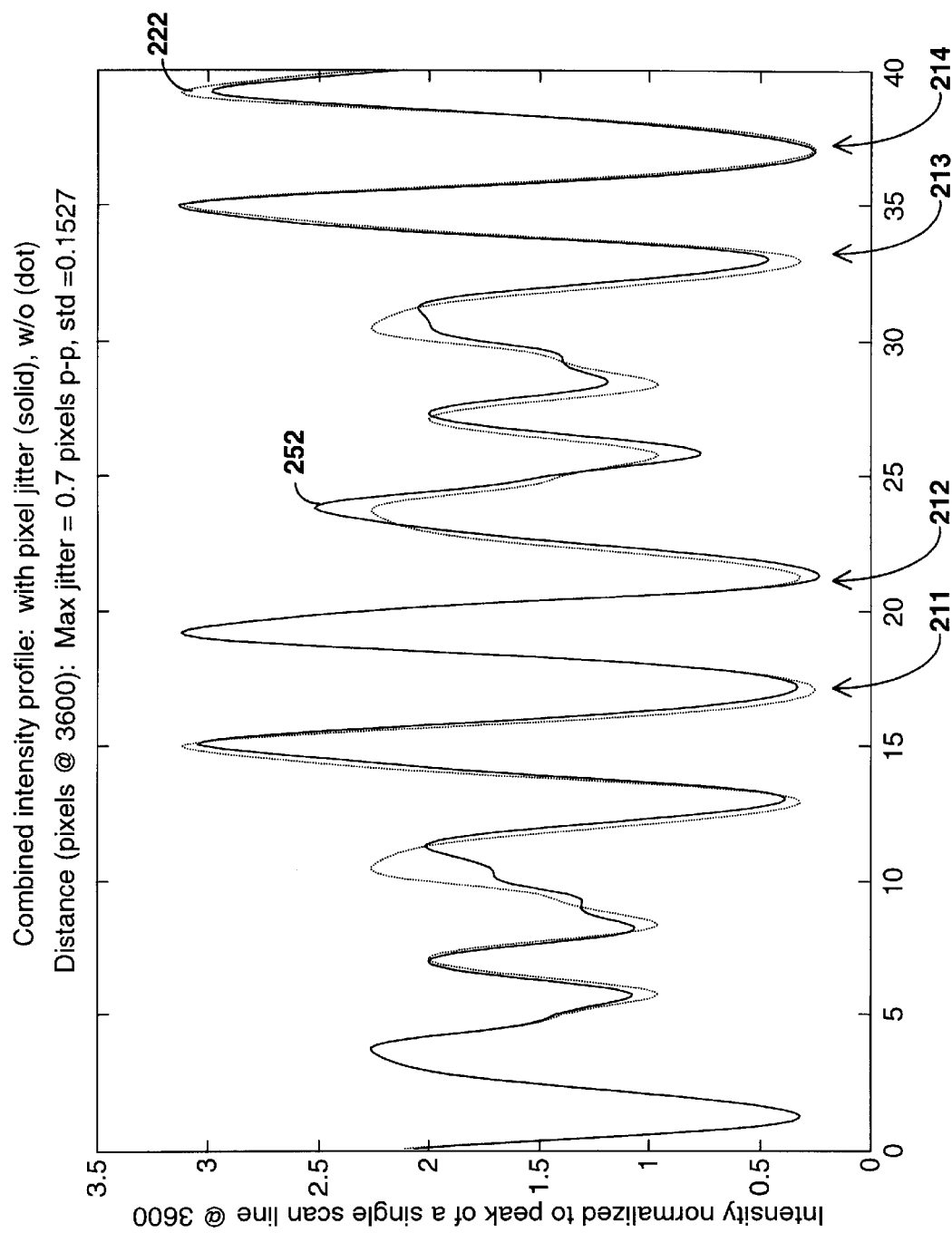
FIG. 13 depicts the intensity profiles of the patterns of FIG. 5 with and without the simulated banding error of FIG. 12.

Referring to FIG. 13, the intensity profile of the combined image of FIG. 7 is shown with (solid line 252) and without (dotted line 222) the simulated banding effect. Changes in the size and shape of the peaks and gaps are visible when noise is added. The gaps 211, 212, 213, 214 shown in FIG. 5 are still present at approximate pixel locations of 17, 21, 33, and 37 pixels respectively in FIG. 13. Although the gap changes due to noise appear subtle in this figure, note that the gap width and amplitude is varying approximately at the media exposure threshold (0.43 on the vertical scale). These variations result in dramatic changes in the media response.

Figure 14:
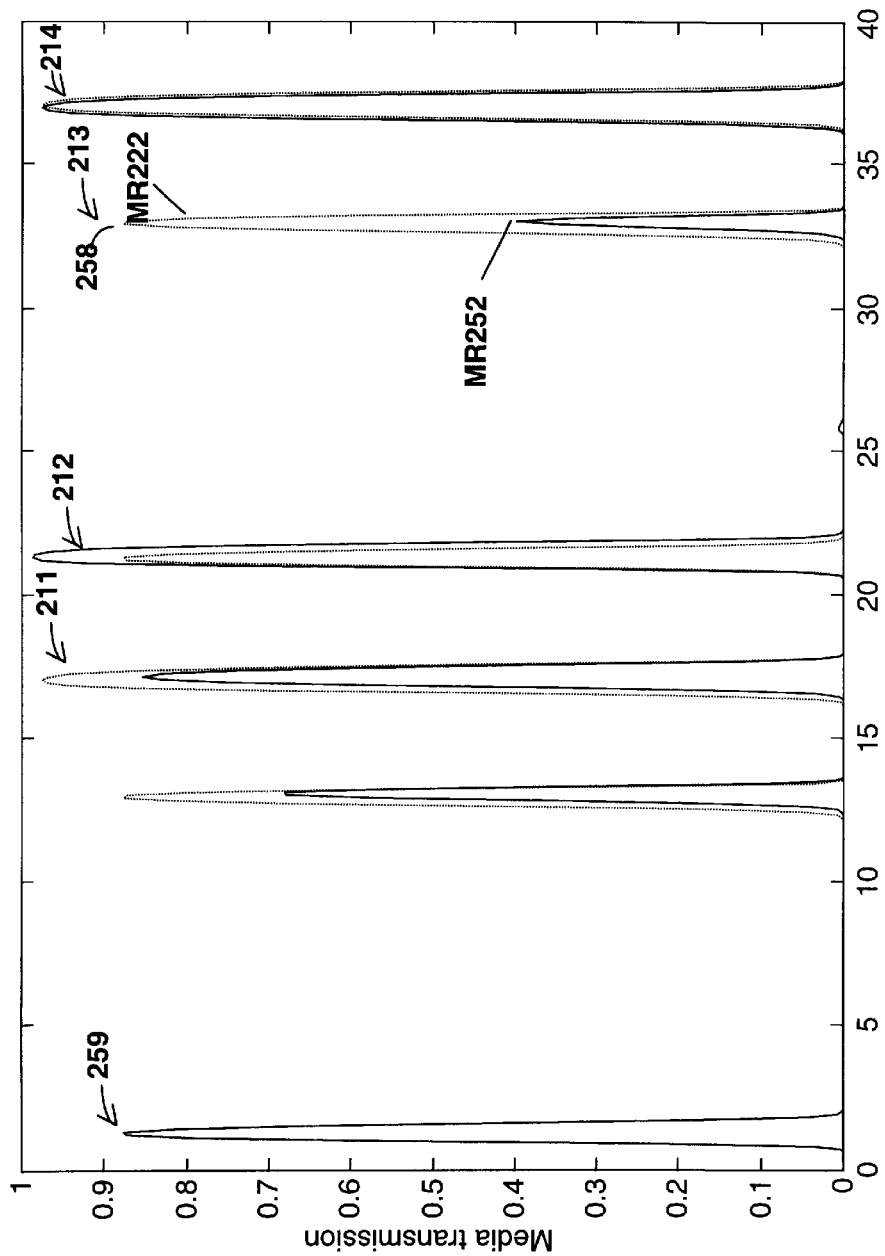
FIG. 14 depicts the media response to the intensity profiles of FIG. 13.

Referring to FIG. 14, the media response of one type of negative film (AGFA Alliance HN imagesetter film) to the intensity profiles of FIG. 13 is shown both with (solid line MR252) and without (dotted line MR222) simulated banding. As before, the gaps 211, 212, 213, 214 shown in FIG. 5 are present in FIG. 14 at approximate pixel locations of 17, 21, 33, and 37 pixels respectively. The width and gray level of the pulses has changed significantly with the added noise. The local transmission of the peak 258 associated with gap 213 of FIG. 5 (at approximate pixel location 33) has changed by a factor of 2 from 90% transmission to about 40% transmission. From this figure, it is clear that relatively small changes in the intensity profile have resulted in large local density changes on the media. The high visibility of the banding indicator results from the various amplitudes and population of these local density changes along the vertical axis height of the indicator. A large population of high amplitude local density changes indicates a high level of banding error. Even when the banding error is less than 1/10 pixel peak-to-peak at 3600 dpi, there is a visible noise pattern presented to the eye of the observer. Generally, the severity of the noise signature is proportional to the banding error (line spacing uniformity error) that generates it. Therefore, a tolerance can be applied to the visual effect of the indicator with the expectation that it will clearly show a visible noise signature even at a level of banding that is deemed acceptable. Traditional banding test methods do not allow this feature since an acceptable banding threshold often translates to a nearly invisible visual effect, making the visual judgement of banding level much more subjective and non repeatable.

Figure 15:
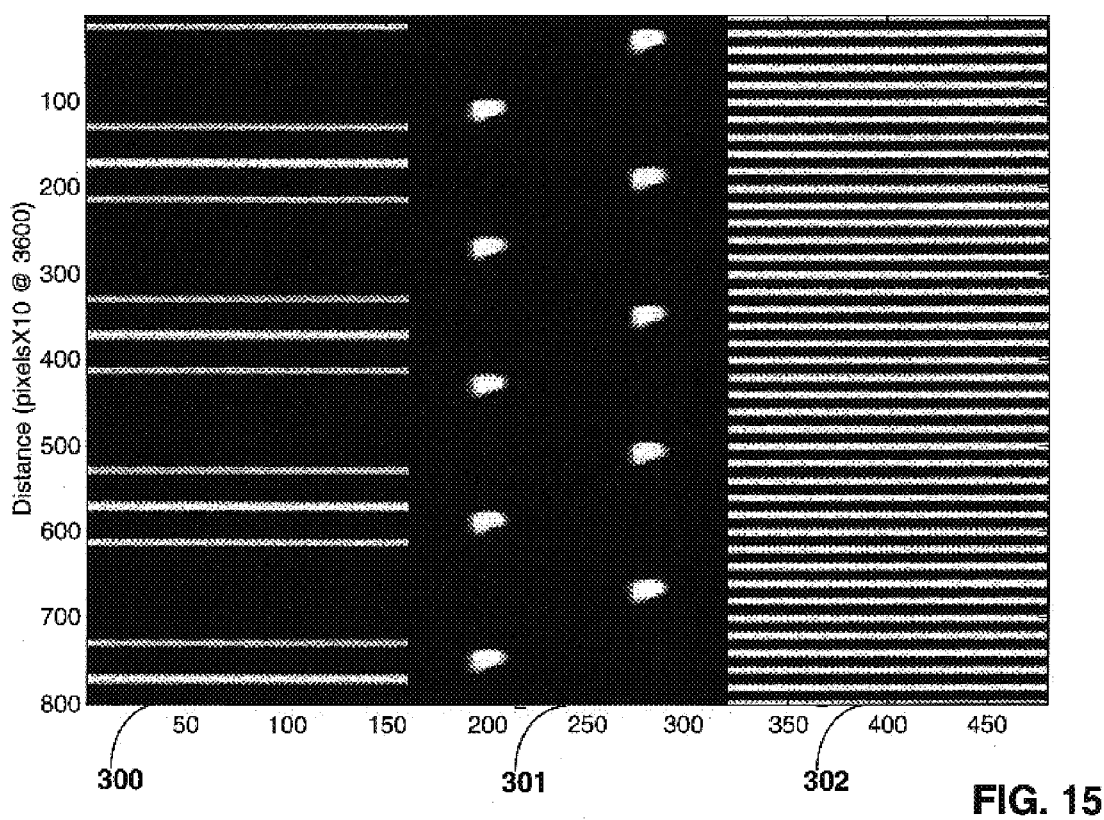
FIG. 15 depicts a cross-section of three images, specifically a banding test indicator according to the invention, a 96% halftone tint, and one-on/one-off horizontal lines imaged at 3600 dpi.

Referring to FIG. 15, a sixteen pixel cross-section of three different patterns are shown to compare the effect of the simulated banding of FIG. 12. The vertical height of the figure is 80 pixels at 3600 dpi (0.022 inch), and is a microscopic view of the patterns as they would appear under approximately 100× magnification. The first pattern 300 is the banding indicator of FIG. 5. The second pattern 301 is a 96% halftone tint. The 96% halftone tint represents a traditional banding test method. The third pattern 302 is one-on/one-off horizontal lines imaged at 3600 dpi, which is another traditional banding test method. The one-on/one-off horizontal lines 302 produce a much lighter tint level, around 60% to 70% depending on the spot size to address ratio of the engine. The lower tint level actually reduces the visibility of a given level of banding compared to a 96% halftone pattern 301, which is why the 96% halftone tint 301 is typically preferred. However, for the purposes of this example, at high magnification the one-on/one-off horizontal lines 302 produce an intuitive indication of the line spacing uniformity error when noise is added.

Figure 16:
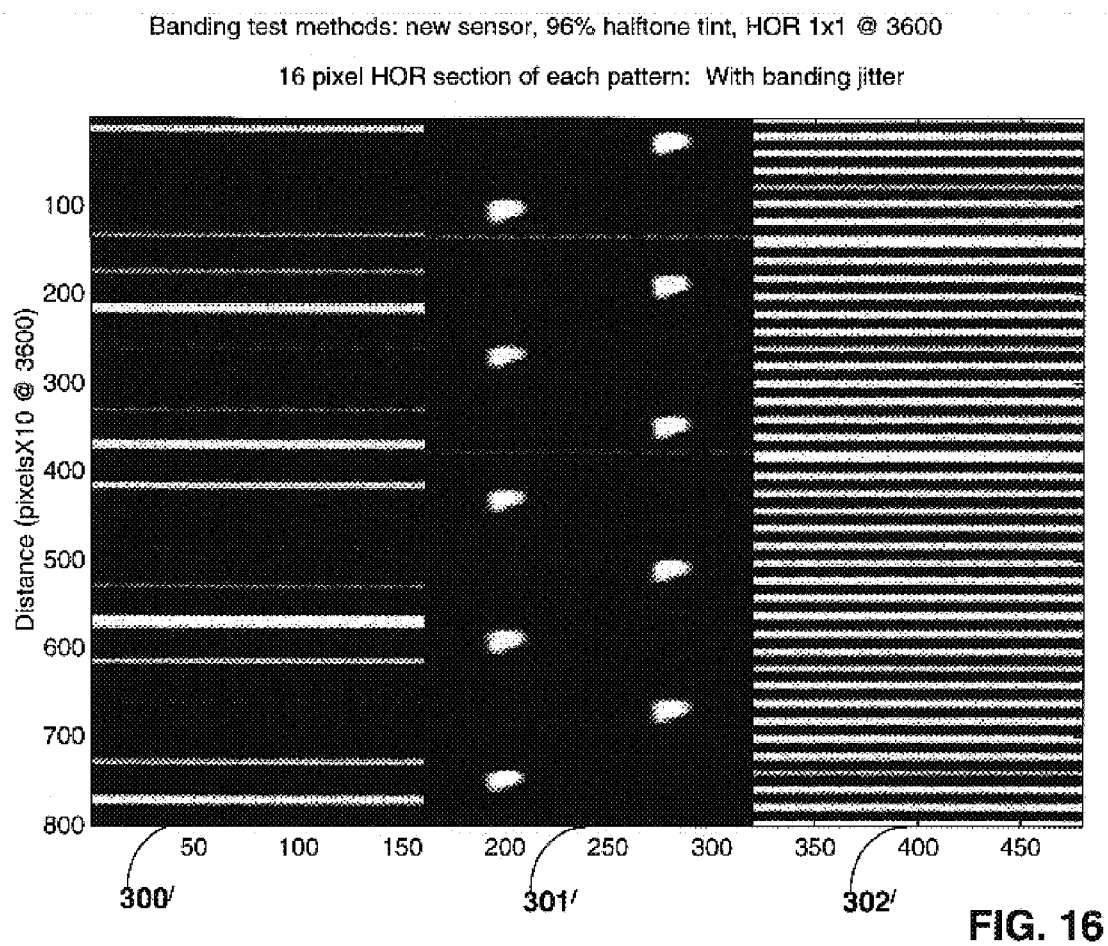
FIG. 16 depicts the images of FIG. 15 subjected to simulated banding error shown in FIG. 12.

Referring to FIG. 16, the patterns of FIG. 15 300, 301, 302 are shown with the simulated banding noise 300', 301', 302'. Again, this is a microscopic view of the three patterns. Under the high magnification the horizontal one-on/one-off pattern 302' shows the variation of the uniformity of line spacing. There are two instances of a large gap in the line pattern as well as several points where the lines come so close together that the space between then has changed from white to gray due to line edge overlap effects. Although this level of banding is visible under high magnification, under normal viewing conditions, for example while viewing copy on a light table at 20 inches, the 96% tint 301' produces a more visible effect than the one-on/one-off line pattern 302'. The normally dark 96% tint 301' shows gray bands where there are wide gaps as shown in the figure. Also, noise-induced changes in the halftone dot size and shape integrate to produce a higher visual impact than the one-on/one-off lines 302'.

When compared to the banding indicator 300', however, the visual effects of the noise in the 96% halftone tint 301' and the one-on/one-off horizontal lines 302' are subtle. For the identical level of line spacing uniformity (banding) error, the banding indicator actually has additional lines at the location of larger gaps and missing lines where the spacing is overly small. All of the thin lines have a variation of media density level due to the noise, which indicates that media transmission has not reached 100% within their width. Also, all of the lines have a variation in width due to the noise. When the character of these microscopic responses is repeated hundreds of times over the approximate one vertical inch height of the indicator the visual impact is dramatic compared to the two traditional test methods, as demonstrated in subsequent figures, which show the visual effects at near normal viewing magnification.

Figure 17:
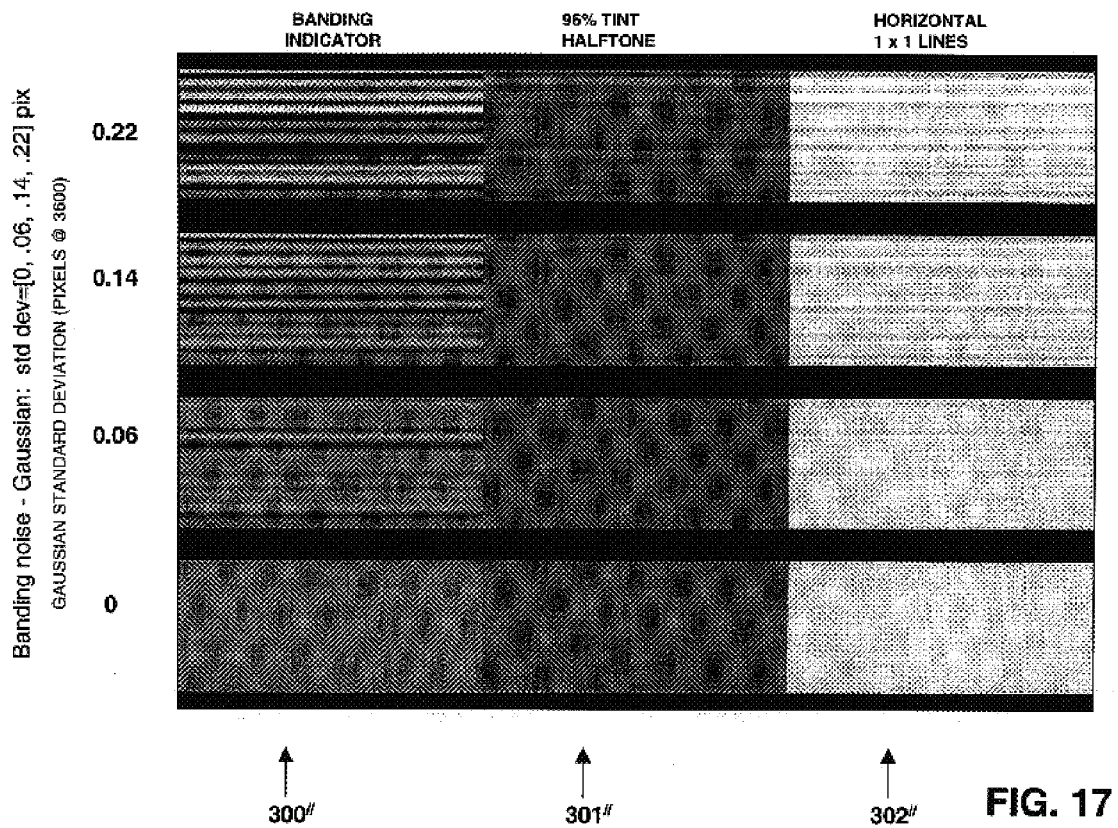
FIG. 17 depicts the images of FIG. 15 subjected to four levels of simulated banding error, and after transformation by an eye response filter.

Referring to FIG. 17, the patterns of FIG. 15 and FIG. 16 are shown when combined with varying amounts of banding error, and when transformed by an "eye filter" that shows the actual visibility of the media effect as visible to the eye. This view of the patterns is closer to normal viewing magnification, with each banding level example showing approximately a ⅙ inch section of the three patterns. In order to present the visual results of the patterns at normal viewing conditions it is necessary to estimate the eye response to the high resolution density changes. A rigorous model of the human visual response system is not necessarily required. Rather, what is needed for both illustration and indicator design is to model a spatial filter function with bandwidth set to the equivalent of the eye resolution limit at 20 inch viewing distance, and which simulates the capacity of the eye to enhance density edge transitions. An example of such an eye filter is described by A. B. Watson and A. J. Ahumada, Jr., "Model of human visual-motion sensing," J. Opt. Soc. Am., Vol. 2, No. 2, February 1985. Each of the banding indicator 300", the 96% halftone tint 301", and the one-on/one-off 3600 dpi horizontal lines 302" are shown with simulated banding error, again using gaussian noise of the type shown in FIG. 12, but with varying magnitudes. Specifically, noise with a standard deviation of 0 (no noise), 0.06, 0.14 and 0.22 pixels at 3600 dpi is shown for each of the patterns.

As shown in FIG. 17, even at 0.06 pixel standard deviation noise, the banding indicator 300" clearly magnifies the banding effect so that it is apparent to the eye. Dark bands across the image are visible, while the effect on the other patterns 301", 302" is not nearly as clear. Even with the noise increased by approximately a factor of four to 0.22 pixels standard deviation, the banding effects on the other images are not very visible, and could be confused with media development or other problems, while the banding effect on the banding display image 300" is very clear, with pronounced dark bands across the image. This figure illustrates that the banding indicator response is highly magnified and yet still proportional to the level of banding noise. Often, engine design tolerances allow a certain minimal degree of banding to be present and still be tolerable without impact on the overall function of the writing engine. An visual example of this tolerable banding limit is shown in FIG. 17 as the standard deviation 0.06 pixel noise level. At this level, the other patterns do not create enough visual effect to make reliable judgement. On the other hand, the banding indicator produces a clearly defined, visible banding signature that could easily be used for comparison with an adjacent reference image that illustrates the acceptable level of banding.

Figure 18:
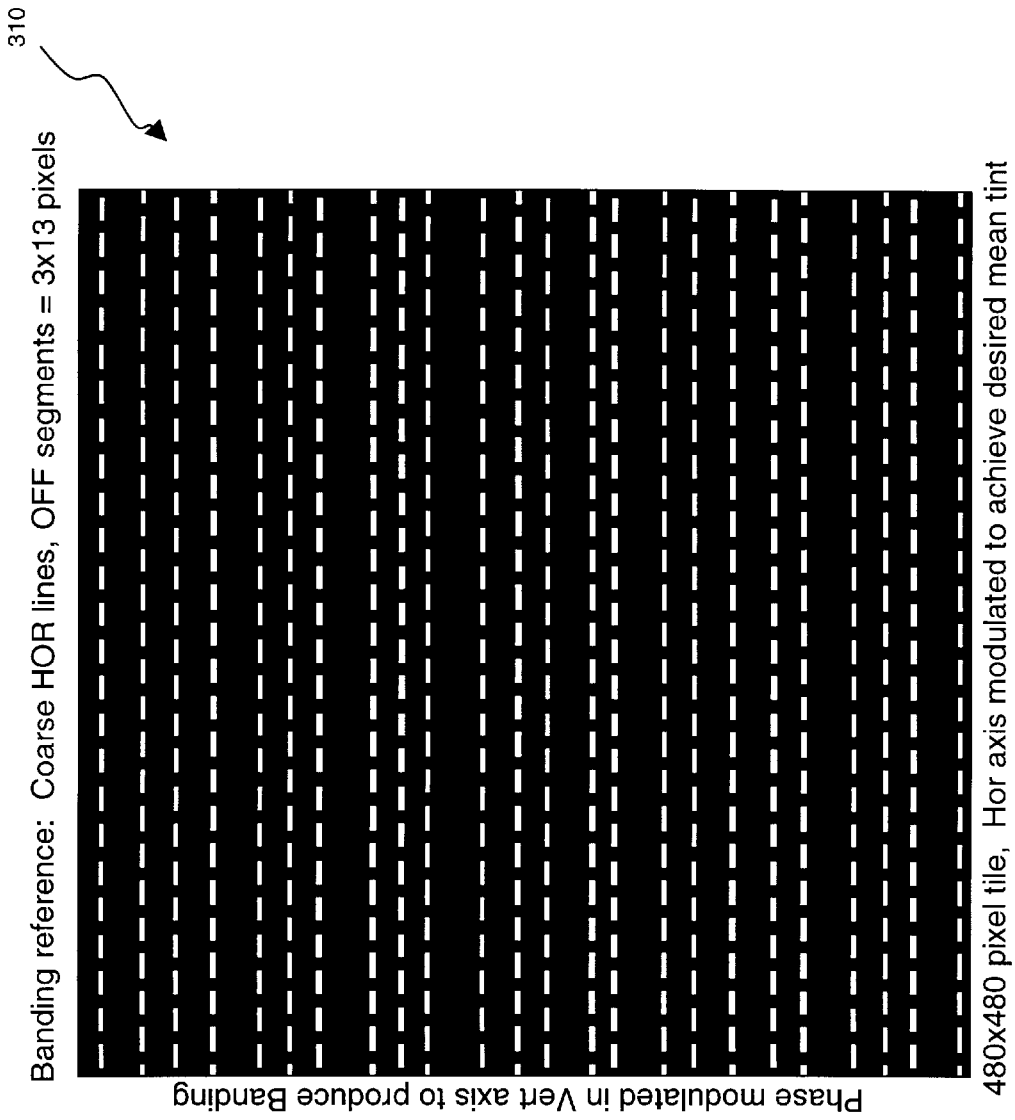
FIG. 18 depicts a tile of a visual reference according to the invention.

Referring to FIG. 18, a visual reference 310 is used for comparison with the banding indicator. The visual reference 310 can be used to determine whether the banding shown on the banding indicator is acceptable. The visual reference 310 provides a visual effect or representation, referred to as a signature, of a given level of response of a banding indicator (or other test indicator) that is consistent and repeatable, and is independent of the level of banding (or other parameter under test). The visual signature is used for subjective comparison with visual indicator that is sensitive to the test parameter. Generally, such a visual reference 310 can be very effective when imaged adjacent to an indicator that is sensitive to the test parameter. representation, referred to as a signature, of a given level of response of a banding indicator (or other test indicator) that is consistent and repeatable, and is independent of the level of banding (or other parameter under test). The visual signature is used for subjective comparison with visual indicator that is sensitive to the test parameter. Generally, such a visual reference 310 can be very effective when imaged adjacent to an indicator that is sensitive to the test parameter.

In one embodiment, a visual reference 310 to be used with a banding indicator produces the same mean tint as the banding indictor. The visual reference 310 is configured to be coarse enough to produce a fixed tint signature that is independent of banding and other process parameters such as exposure and focus quality. Yet, the visual reference 310 is also configured to be fine enough not be visible to the eye at normal viewing distance (i.e. it appears to be a tint), or it appears to be a pattern similar to the actual banding signature. For example, if the banding indicator is designed so that banding has the appearance of horizontal lines, then any visible or nearly visible structural feature of the visual reference 310 also appears as horizontal lines. The visual reference 310 is also configured to have enough tonal resolution (tint range) to smoothly replicate the desired banding signature to be used as a pass/fail standard.

Such a visual reference 310 can be used to provide one or more visual pass/fail references along with one or more indicators that are imaged onto a media or provided to an automated image detector. The visual reference 310 provides a visual means of calibrating error magnitude. For example, a series of visual references can be used to show progressively larger (banding) error magnitude for visual comparison. The visual reference 310 also can be used to provide immediate image diagnostics. There may be many types of signatures with similar visual density contrast levels (banding severity). A visual reference can show specific banding examples representing specific banding error sources, for example spin motor cross scan jitter, dynamic spot distortion, leadscrew (media transport) signature, servo errors, modulation errors, and so on. The visual reference thus can enable the user to immediately quantify both the magnitude and the possible source of a banding problem (or other image artifact problem). This is often overlooked as valuable feature of banding-when visually magnified, the banding becomes a diagnostic tool.

The visual reference can also show the response of the indicator to variables other then the imaging paramter intended for measurement. For example, a given banding indicator design might provide a high gain signature of amplitude proportionate to banding severity, but the character of the signature might vary slightly with registration error between the overlaid tiles. The reference tile could show the expected state of the signature for several values of registration error. Other possible variables are exposure, focus setting, and so on. Note that such a reference would show banding at a given state of process variable, but not show the state of the process variable alone.

One method for designing a visual reference includes first selecting the banding level and signature type to be used as the visual standard. This is done by visual (and other) observation of samples of actual banding signatures. Typically the banding signatures observed range from very subtle to vary dramatic, so that a suitable visual range is available for selection of a calibration standard. Typically, the response of the high gain sensor is correlated to the lower gain response of an applications test pattern, such as a 96% halftone tint. In other words, the acceptable tolerance limit in the applications test pattern is chosen, and matched with the response of the indicator. This indicator response is to be replicated in the reference. Next, microdensitometer measurements of the selected indicator are made, in order to quantify the high resolution density structure of the sensor tile. Then, using a model of the eye response, the measured high resolution density profile is filtered with an eye response filter to predict the lower resolution visual pattern that the eye will interpret under the intended viewing conditions of illumination, view angle, view distance, and so on. The predicted eye response signature is sampled at a lower spatial frequency, typically the coarse spatial frequency of the reference tile tint pattern structure. The eye response signature can then be replicated in the coarse structure of the reference tile tint pattern. It is then possible to perform a visual comparison between the selected indicator tile and the low resolution replica of the eye response to this tile to check and refine the design of the replica.

Another method for designing a visual reference includes selecting the banding level and signature type to be used as the visual standard, as above, and then using the coarse pattern structure of the reference tile tint pattern to produce an array of calibrated tint noise signatures. These could be of various signature types and density variation amplitudes generated using Gaussian random noise with appropriate spatial filtering to vary noise deviation, bandwidth, and so on. Then, a reference pattern can be selected from the low resolution array that best matches the chosen standard for indicator response. In this method, if the banding signature includes known parameter signatures such as leadscrew error, those signatures can be incorporated in the noise pattern.

Yet another variation includes using a computer model to predict the indicator response to a range of simulated (banding) error levels resulting from varying writing engine parameters. The visual reference standard can then be selected, and the process followed as above. Additionally, different sources of banding error can be simulated over a range of parameter error levels to provide visual diagnostic reference patterns. For example, the signature of the banding error assosciated with a misaligned leadscrew can be identified to illustrate the acceptable level of alignment in the visual reference.

Still referring to FIG. 18, the visual reference 310 is a 480×480 pixel (0.133×0.133 inch) segment of a reference tile. The mean tint level of the reference is 90%. Goals of this reference pattern design was to achieve a high tint level, create a fixed tint signature that remained insensitive to banding, and at the same time provide the tonal range sufficient to replicate the signature. To minimize sensitivity to banding, the white lines in the pattern have a fixed vertical width of 3 pixels at 3600 dpi. The horizontal axis is modulated on/off with a coarse 20 pixel pitch to achieve the 90% tint with 3 pixel wide lines. The horizontal modulation pattern is sufficiently coarse to be relatively insensitive to modulation response variations, and yet fine enough not to be visible to the eye. The vertical axis pattern has a mean pitch of 16 pixels. The tonal changes necessary to replicate the banding signature are generated by varying the vertical spacing between the three pixel white lines to create local tonal variations. When viewed by eye under normal viewing conditions the pattern visually simulates the effect of the desired banding signature, but is not affected by banding. In other words, the pattern will have the appearance of the same fixed reference banding level even for varying amounts of actual banding.

Figure 19:
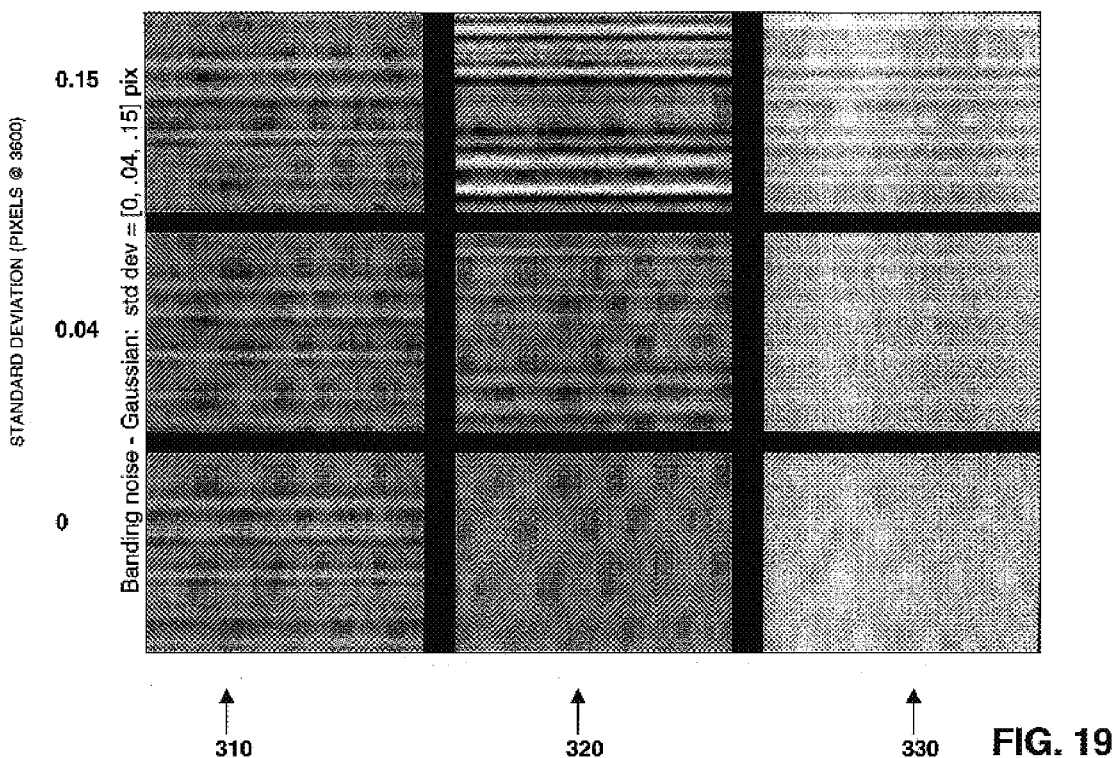
FIG. 19 depicts the visual reference of FIG. 17, a banding indicator according to the invention, and one-on/one-off horizontal lines, each subjected to three levels of simulated banding error.

Referring to FIG. 19, the banding reference 310, the banding display sensor 320 and horizontal one-on/one-off lines (for comparison) 330 are shown for various amounts of simulated banding noise, specifically 0, 0.04, and 0.15 pixels standard deviation. This view of the patterns shows approximately a ⅙ inch vertical section of three patterns for each of three levels of simulated banding error. These images are shown after transformation by an eye response filter, to show the image as it would be perceived by the eye. The banding reference 310 is unchanged for the various amounts of simulated banding error. The banding sensor 320 clearly shows changes for the different amounts of error. The banding sensor 320 also can be easily compared to the banding reference 310, to determine whether the amount of banding is acceptable with minimal subjective error. For example, if an acceptable amount of banding is 0.04 standard deviation, then it is clear from the images that the 0 error is better than the reference, 0.04 error is approximately the same as the reference, and 0.15 error is much worse than the reference.

Figure 20:
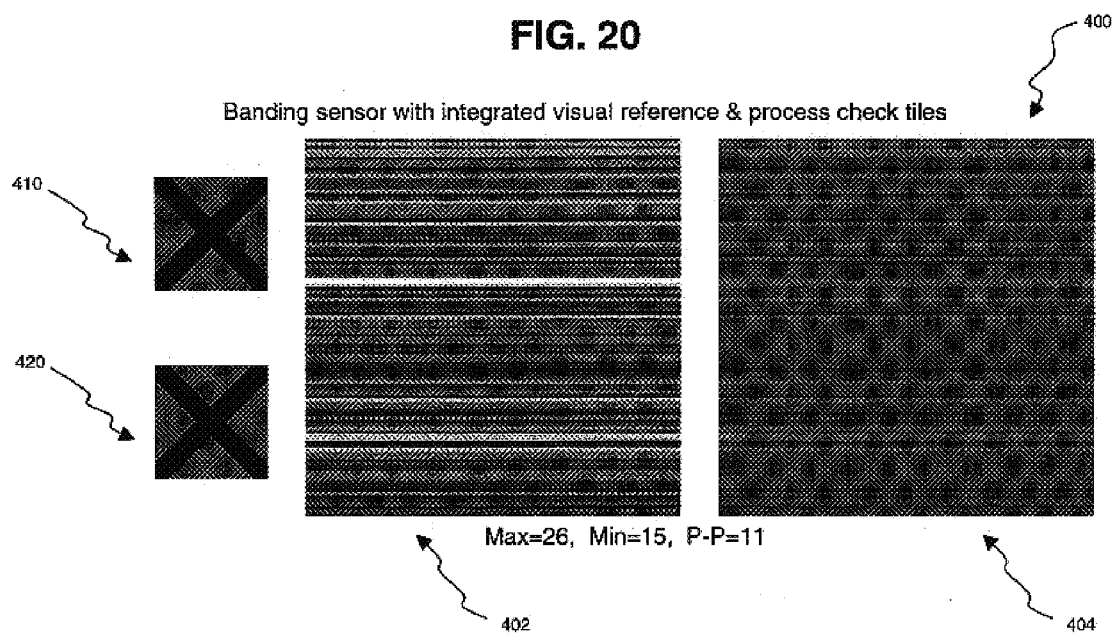
FIG. 20 depicts a banding indicator with visual reference and process check tiles according to the invention.

Referring to FIG. 20, a visual indicator 400 for detecting banding includes a first portion 402 that is sensitive to banding. In one embodiment, the first portion 402 is the banding display described above. In another embodiment, the first portion 402 is a variation on the banding indicator described above. In yet another embodiment, the first portion 402 is another image that is sensitive to banding. In one embodiment, the first portion 402 is a one-inch square. This one inch square is sufficient to make banding errors apparent to the eye, using the banding indicator described above.

The visual indicator 400 also includes a second portion 404 adjacent to the first portion. The second portion 404 includes a reference, which provides a fixed visual effect that is independent of system banding. In one embodiment, the second portion is created with a coarse tint, such as described above with regard to FIG. 18. The first portion 402 and the second portion 404 can be visually compared to determine if there is system banding. In another embodiment, the second portion 404 is also a one-inch square. This one inch square in combination with the banding indicator 402 is sufficient to identify whether the amount of banding, and made apparent in the banding display of the first portion 402 is acceptable. In the embodiment shown, there is 0.1 inch of clear (unexposed) space between the first portion 402 and the second portion 404. This space is not necessary, but helps separate the two adjacent portions 402, 404.

Optionally, in one embodiment, the visual indicator 400 includes one or more other imaging parameter indicators, such as the imaging parameter indicators of FIG. 2. Such indicators can provide information about exposure, PWM, and/or other imaging parameter configurations of the writing engine. In the embodiment shown in the figure, one indicator is configured to display the exposure setting for 1800 dpi, and the other indictor is configured to display if the exposure setting for 3600 dpi. This is not a limitation of the invention, however, and it should be clear that other indicators can be used to provide other information about the state, configuration, or operating capability of the writing engine. In one embodiment, the indicators are each ⅓ inch square.

Use of the imaging paramter indicators 410, 420 in combination with the banding indicator 404 and reference 402 provides a compact image that can be used to configure or to qualify a writing engine. Alternatively, the visual indicator 400 can be imaged on an unused portion of media when the writing engine is in operation, to verify the operating functionality of the writing engine.

Variations, modifications, and other implementations of the visual sensor described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A visual indicator comprising:
   a reference portion comprising a first image independent of banding; and
   a banding test portion adjacent to the reference portion comprising (1) a second image sensitive to banding, and (2) two patterns which when superimposed together magnify visibility of banding errors in the second image.

2. The indicator of claim 1 wherein the two patterns of the banding test portion are superimposed by first imaging a first pattern and then imaging a second pattern on the second image.

3. The indicator of claim 1 wherein the banding test portion comprises two patterns which when superimposed together magnify visibility of adjacent line spacing errors.

4. The indicator of claim 1 wherein the two image patterns of the banding test portion are imaged at different addressabilities.

5. The indicator of claim 1 wherein the two image patterns of the banding, test portion are imaged with different spot sizes.

6. The indicator of claim 1 wherein the two patterns comprise a first pattern imaged at a first addressability n, and a second pattern imaged at a second addressability m, wherein the first pattern and the second pattern are superimposed, and wherein m≧n.

7. The indicator of claim 1 wherein the banding test portion comprises a first pattern imaged at a first addressability n, and a second pattern imaged at a second addressability m, wherein the first and second patterns are superimposed, and wherein m is approximately 2n.

8. The indicator of claim 7 wherein the banding test portion comprises superimposed horizontal one-on/one-off lines imaged at a first addressability n, and horizontal two-on/three-off horizontal lines imaged at a second addressability m, where m is approximately 2n.

9. The indicator of claim 8 wherein the banding test portion comprises superimposed horizontal 1-on, 1-off lines imaged at 1800 dpi and horizontal 2-on, 3-off horizontal lines imaged at 3600 dpi.

10. The indicator of claim 1 wherein the reference portion comprises a coarse pattern.

11. The indicator of claim 1 wherein the reference portion comprises a coarse pattern modulated in the cross-scan axis to simulate banding.

12. The indicator of claim 1, further comprising:
    at least one process check portion adjacent to one of the banding test portion and the reference portion.

13. The indicator of claim 12 wherein the process check portion comprise:
    a first process check portion having a first imaging characteristic; and
    a second process check portion proximate to the first process check portion having a second imaging characteristic;
    wherein the imaging characteristic of one of the first and second process check portions is less sensitive to an imaging parameter than the imaging characteristic of the other of the first and second process check portions, and wherein the imaging characteristic of the first process check portion and the second process check portion appear substantially similar for at least one imaging parameter setting range and appear different otherwise.

14. The indicator of claim 13 wherein one of the first and second process check portions comprises a coarse tint and the other of the first and second process check portions comprises a fine tint.

15. The indicator of claim 14 wherein the coarse tint is a (n×n) periodic pattern and the fine tint is a (m×m) periodic pattern such that (n>m).

16. The indicator of claim 13 wherein the imaging parameter is at least one parameter chosen from the set of exposure setting, pulse width modulation, focus, balance, spot size, spot shape, spot ellipticity, sidelobes size, sidelobes shape, sidelobes intensity, media gamma, edge sharpness, dot gain, uniformity, ink receptivity of plate material, physical media changes, pattern dependent effects, sensitivity to position errors, and sensitivity to exposure errors.

17. A method for generating a visual indicator, comprising:
    forming a reference portion comprising a first image independent of banding; and
    forming a binding test portion adjacent to the reference portion comprising (1) a second image sensitive to banding, and (2) two patterns which when superimposed together magnify visibility of banding errors in the second image.

18. The method of claim 17 wherein the banding test portion further comprises two patterns which when superimposed magnify visibility of adjacent line spacing errors in the second image.

19. The method of claim 17 wherein the step of forming the banding test portion comprises imaging a first pattern and then imaging a second pattern overlaid on the first pattern.

20. The method of claim 19 wherein the step of forming the banding test portion further comprises imaging the first pattern at a first imaging parameter setting and then imaging the second pattern overlaid on the first pattern at a second imaging parameter setting.

21. The method of claim 20 wherein the step of forming the banding test portion further comprises imaging the first pattern at a first addressability and then imaging the second pattern overlaid on the first pattern at a second addressability.

22. The method of claim 21 wherein the step of forming the banding test portion further comprises imaging the first pattern at the first addressability n and then imaging the second pattern overlaid on the first pattern at the second addressability m, where m≧n.

23. The method of claim 22 wherein the step of forming the banding test portion comprises imaging the first image pattern at the first addressability n and then imaging the second image pattern overlaid on the first image pattern at the second addressability m, where m is approximately 2n.

24. The method of claim 23 wherein the step of forming the banding test portion further comprises imaging the first pattern of one-on/one-off horizontal lines at the first addressability n and then imaging the second pattern of two-on/three-off horizontal lines overlaid on the first pattern at a second addressability m, where m is approximately 2n.

25. The method of claim 22 wherein the step of forming the banding test portion further comprises superimposing horizontal 1-on, 1-off lines imaged at 1800 dpi and horizontal 2-on, 3-off horizontal lines imaged at 3600 dpi.

26. The method of claim 17 wherein the first image comprises a coarse pattern.

27. The method of claim 17 wherein the first image comprises a coarse pattern modulated in a cross scan axis to simulate banding.

28. The method of claim 17, further comprising the step of forming a process check portion adjacent to one of the banding test portion and the reference portion.

29. The method of claim 28 wherein the step of forming the process check portion comprises:

forming a first process check portion having a first imaging characteristic; and forming a second process check portion proximate to the first process check portion having a second imaging characteristic; and wherein the imaging characteristic of one of the first and second process check portions is less sensitive to an imaging parameter than the imaging characteristic of the other of the first and second process check portions, such that the imaging characteristic of the first process check portion and the second process check portion appear substantially similar for at least one imaging parameter setting range and appear different otherwise.

30. The method of claim 29 wherein one of the first and second process check portions comprises a coarse tint and the other of the first and second process check portions comprises a fine tint.

31. The method of claim 30 wherein the coarse tint is a (n×n) periodic pattern and the fine tint is a (m×m) periodic pattern such that (n>m).

32. The method of claim 29 wherein the imaging parameter is at least one parameter chosen from the set of exposure setting, pulse width modulation, focus, balance, spot size, spot shape, spot ellipticity, sidelobes size, sidelobes shape, sidelobes intensity, media gamma, edge sharpness, dot gun, uniformity, ink receptivity of plate material, physical media changes, pattern dependent effects, sensitivity to position errors, and sensitivity to exposure errors.

33. A method for generating a banding indicator, comprising:

imaging a first pattern at a first imaging parameter configuration value at a first addressability n;

imaging a second pattern overlaid on the first pattern, the second pattern imaged at a second imaging paramter configuration value at a second addressability m, where $m \geq n$;

wherein the first and second pattern are configured so that the image resulting from the overlay of the first pattern and the second pattern is sensitive to banding.

34. A visual reference for characterizing banding indicated by a banding indicator, the visual reference comprising an image course enough to produce a tint signature that is relatively independent of banding, exposure setting, and focus setting; said image having the same mean tint level a the banding indicator.

\* \* \* \* \*